(12) United States Patent
Anim-Appiah

(10) Patent No.: US 9,781,254 B1
(45) Date of Patent: Oct. 3, 2017

(54) TRAINING-BASED BACKPLANE CROSSTALK CANCELLATION

(71) Applicant: Futurewei Technologies, Inc., Plano, TX (US)

(72) Inventor: Kofi Dankwa Anim-Appiah, Morgan Hill, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/410,696

(22) Filed: Jan. 19, 2017

Related U.S. Application Data

(60) Provisional application No. 62/436,357, filed on Dec. 19, 2016.

(51) Int. Cl.
*H04M 1/24* (2006.01)
*H04M 3/08* (2006.01)
*H04M 3/22* (2006.01)
*H04M 3/34* (2006.01)
*H04J 1/12* (2006.01)
*H04B 3/32* (2006.01)

(52) U.S. Cl.
CPC .............. *H04M 3/34* (2013.01); *H04B 3/32* (2013.01); *H04J 1/12* (2013.01)

(58) Field of Classification Search
CPC ....... H04B 3/32; H04L 25/0224; H04L 25/14; H04L 27/2663; H04L 27/2665; H04L 27/2675; H04M 11/062

USPC ..... 379/1.01, 3, 12, 22, 22.02, 22.08, 27.02, 379/27.04, 31, 32.02, 406.01, 406.08, 406
See application file for complete search history.

(56) References Cited

U.S. PATENT DOCUMENTS

| | | | |
|---|---|---|---|
| 2008/0159448 A1 | 7/2008 | Anim-Appiah et al. | |
| 2009/0103572 A1* | 4/2009 | Zerbe .................. | H04L 25/14 370/503 |
| 2014/0161000 A1* | 6/2014 | Fazlollahi .............. | H04B 3/32 370/280 |
| 2015/0146868 A1* | 5/2015 | Tu ........................ | H04L 25/0224 379/406.03 |

* cited by examiner

*Primary Examiner* — Binh Tieu
(74) *Attorney, Agent, or Firm* — Zilka-Kotab, PC

(57) ABSTRACT

A system, computer readable medium, and method are provided for training a serial communication link to perform crosstalk cancellation. The method includes the steps of, for each crosstalk channel of one or more crosstalk channels, transmitting a training sequence over a crosstalk channel, estimating a phase offset associated with the crosstalk channel, and selecting a set of symbol response coefficients. The method further includes steps for configuring the serial communication link to perform crosstalk cancellation utilizing the selected set of symbol response coefficients and, for each crosstalk channel, updating the selected set of symbol response coefficients every number of Baud durations corresponding to the crosstalk channel.

20 Claims, 15 Drawing Sheets

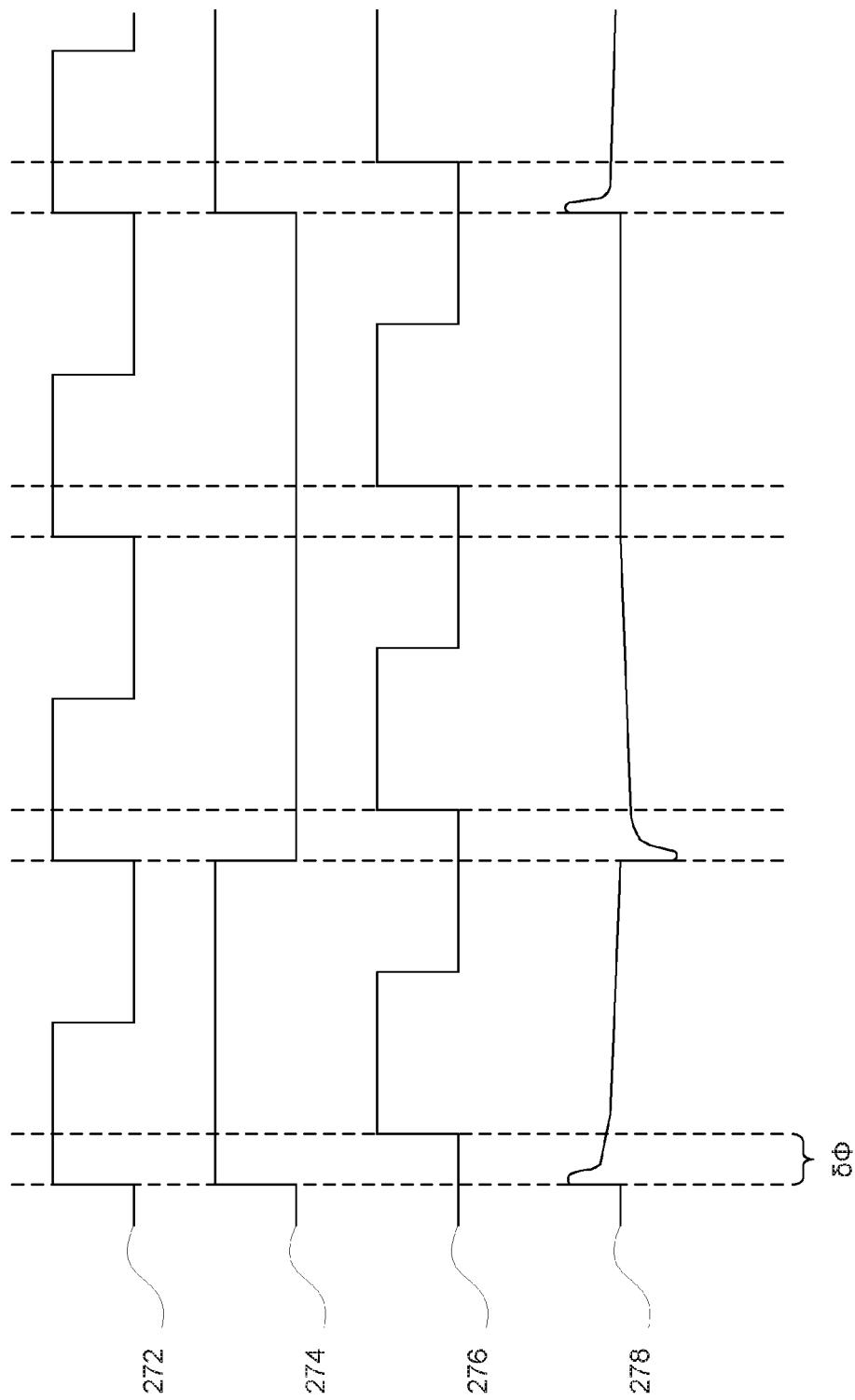

TRAINING-BASED BACKPLANE CROSSTALK CANCELLATION

CROSS-REFERENCE TO RELATED APPLICATIONS

This application claims the benefit of U.S. Provisional Patent Application No. 62/436,357 filed Dec. 19, 2016, the entire contents of which are incorporated herein by reference.

FIELD OF THE INVENTION

The present invention relates to signal processing, and more particularly to crosstalk cancellation for backplane channels.

BACKGROUND

Large amounts of data are transmitted across networks in contemporary telecommunications systems. The data may be routed through data centers that include telecommunications hardware. The data center may include hundreds or thousands of routers and/or switches for enabling data transmission between devices across the network. These routers and switches are typically implemented in a compact form factor that enables a data center to easily scale the capacity of the network by adding additional hardware. For example, a data center may include a plurality of chassis on one or more racks. The chassis is a frame or housing that allows easy mounting of different circuit components. A power supply and backplane may be mounted to the chassis and different line cards may be inserted into connectors on the backplane. The backplane routes power from the power supply to each of the line cards and routes data from one line card to another line card. Line cards provide access to the network for one or more different interfaces (e.g., POTS, ISDN, VDSL, etc.).

A typical backplane is comprised of thousands of individual channels (i.e., serial links), which may be realized as copper traces on a large, multi-layer printed circuit board (PCB). Data may be transmitted across a channel using serial communication. A device known as a Serializer/Deserializer (SerDes), which currently operates at data rates of 25 Gbps or higher, may be included in one or more integrated circuits on each line card and used for routing high-speed data on the backplane. A SerDes device may include a serial-line receiver, a serial-link transmitter, or a serial-link transceiver. The SerDes device may receive data symbols for transmission and convert the data symbols into a transmission signal that is sent over the channel via a high speed transmitter. A different SerDes device also coupled to the channel may receive the transmission signal at a receiver and convert the transmission signal back into the data symbols. Data symbols may be single bits (i.e., logic high or logic low) encoded as particular voltage levels or transitions of voltage levels, or data symbols may be multiple bits, such as in PAM encoding, 8b/10b encoding, and the like. Current SerDes devices are capable of operating at a bit error rate (BER) of less than $10^{-15}$. Each integrated circuit included on the line card typically incorporates many high-speed serial-link transmitters and receivers that can operate concurrently on a backplane.

The dense network of channels on a backplane constitutes one of the impediments to achieving low BERs. When a signal is transmitted over one channel, the current in a particular trace on the circuit board may induce an electromotive force (EMF) on neighboring traces, which is commonly referred to as crosstalk. The higher the frequency of a signal on one channel, the greater the noise induced on the other channel. Thus, a "victim" receiver on a particular channel receives, simultaneously, the signal intended to be received from a transmitter coupled to that channel as well as additional noise from one or more other crosstalk channels. Consequently, crosstalk cancellation becomes increasingly attractive as a means to increase the data rate of these devices. Thus, there is a need for addressing this issue and/or other issues associated with the prior art.

SUMMARY

A system, computer readable medium, and method are provided for training a serial communication link to perform crosstalk cancellation. The method includes the steps of, for each crosstalk channel of one or more crosstalk channels, transmitting a training sequence over a crosstalk channel, estimating a phase offset associated with the crosstalk channel, and selecting a set of symbol response coefficients. The method further includes steps for configuring the serial communication link to perform crosstalk cancellation utilizing the selected set of symbol response coefficients and, for each crosstalk channel, updating the selected set of symbol response coefficients every number of Baud durations corresponding to the crosstalk channel.

In a first embodiment, estimating the phase offset associated with the crosstalk channel includes the step of collecting a set of samples of the training sequence response signal. Then, for each phase offset in a plurality of phase offsets, the steps further include calculating a difference value for each sample in the set of samples of the training sequence response signal by subtracting a pre-computed response value associated with the phase offset from the sample, squaring the difference value for each sample, and summing the squared difference values to calculate a metric value for the phase offset. Calculating the metric value according to this method comprises calculating a squared Euclidean norm metric for the error signal corresponding to each phase offset. Then, a phase offset in the plurality of different phase offsets is selected that minimizes the metric value. The plurality of phase offsets comprise a number M of phase offsets uniformly distributed over a baud duration T.

In a second embodiment (which may or may not be combined with the first embodiment), estimating the phase offset associated with the crosstalk channel includes the step of collecting a set of samples of the training sequence response signal. Then, for each phase offset in a plurality of phase offsets, the steps further include calculating a difference value for each sample in the set of samples of the training sequence response signal by subtracting a pre-computed response value associated with the phase offset from the sample, and summing the absolute values of the difference values to calculate a metric value for the phase offset. Calculating the metric value according to this method comprises calculating an error $l_1$-norm metric for each phase offset. Then, a phase offset in the plurality of different phase offsets is selected that minimizes the metric value. The plurality of phase offsets comprise a number M of phase offsets uniformly distributed over a baud duration T.

In a third embodiment (which may or may not be combined with the first and/or second embodiments), updating the selected set of symbol response coefficients utilized to perform crosstalk cancellation for the crosstalk channel includes the steps of measuring a frequency offset associated with the crosstalk channel, and calculating a number of Baud durations corresponding to the crosstalk channel based on the frequency offset and a number M of phase offsets in a plurality of phase offsets distributed over a baud duration T.

In a fourth embodiment (which may or may not be combined with the first, second, and/or third embodiments), updating the selected set of symbol response coefficients utilized to perform crosstalk cancellation for the crosstalk channel includes the steps of calculating a metric value based on an average error accumulated over a number of D baud durations for the selected set of symbol response coefficients and two corresponding sets of symbol response coefficients, comparing the metric values to determine a minimum metric value, and configuring the serial communication link to perform crosstalk cancellation utilizing the set of symbol response coefficients corresponding to the minimum metric value during a next number of baud durations.

In a fifth embodiment (which may or may not be combined with the first, second, third, and/or fourth embodiments), the serial communication link comprises a trace on a backplane coupled to two or more line cards, wherein the trace is coupled to a first connector coupled to a first line card in the two or more line cards and a second connector coupled to a second line card in the two or more line cards, wherein the first connector is coupled to a trace on the first line card that couples the trace on the backplane to a serializer/deserializer (SerDes) device included in an integrated circuit included on the first line card, and wherein the second connector is coupled to a trace on the second line card that couples the trace on the backplane to a SerDes device included in an integrated circuit included on the second line card.

In a sixth embodiment (which may or may not be combined with the first, second, third, fourth, and/or fifth embodiments), the SerDes device included in the integrated circuit included on the first line card is a serial-link receiver configured to sample the serial communication link according to an in-service phase of a receive clock.

In a seventh embodiment (which may or may not be combined with the first, second, third, fourth, fifth, and/or sixth embodiments), the SerDes device included in the integrated circuit included on the second line card is a serial-link transmitter configured to transmit the training sequence over the crosstalk channel according to an in-service phase of a transmit clock.

In an eighth embodiment (which may or may not be combined with the first, second, third, fourth, fifth, sixth, and/or seventh embodiments), a controller on a first line card is configured to: estimate the phase offset associated with the crosstalk channel based on the sampled training sequence response signal, and select the set of symbol response coefficients based on the estimated phase offset.

To this end, in some optional embodiments, one or more of the foregoing features of the aforementioned apparatus, system, and/or method may afford a more effective noise cancellation technique for a serial communication link that, in turn, may enable higher throughput rates of the serial communication link without realizing significantly higher bit error rates. It should be noted that the aforementioned potential advantages are set forth for illustrative purposes only and should not be construed as limiting in any manner.

BRIEF DESCRIPTION OF THE DRAWINGS

FIG. 21B illustrates a timing diagram of various signals, in accordance with one embodiment;

DETAILED DESCRIPTION

Figure 1:
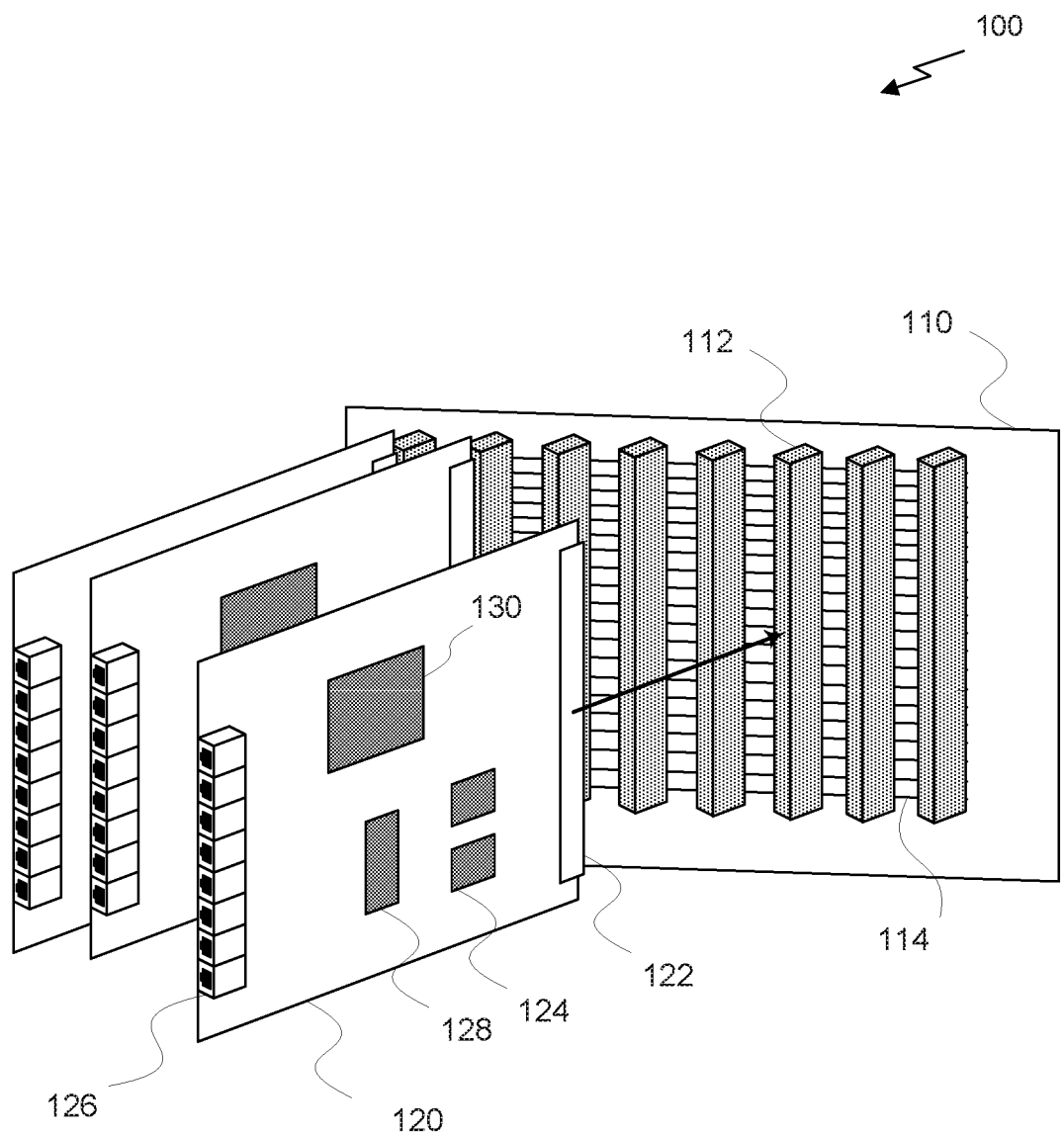
FIG. 1 illustrates a communications system for transferring data between two devices via a serial communication link, in accordance with one embodiment.

Crosstalk cancellation has been used in several different forms by communications systems engineers in various data-communications systems where crosstalk severely limits system performance. The ubiquitous Very-high-bit-rate Digital Subscriber Line (VDSL or VHDSL) is one such example system. However, a deployment that includes SerDes devices coupled to a particular backplane has some unique properties that particularly encourage certain aspects of crosstalk cancellation. The most notable of these properties is that a given backplane design is replicated very closely in a large number of different deployments. In other words, regardless of which variety or configuration of line cards are implemented in a telecommunication system, the chassis and backplanes utilized across the entire system are likely to be similar if not identical. Only minor differences may exist between two similar backplanes, due chiefly to manufacturing tolerances that allow for slight variances between different devices. For example, the distance between two traces on a circuit board or the thickness of a copper layer may vary by a few micrometers, which will affect the magnitude of crosstalk between the two channels. Thus, a given channel and all related channels that are primary sources of crosstalk are virtually identical in all deployments of that backplane. Another notable property is that most of the primary sources of crosstalk for a given channel are usually limited to the adjacent channels on the connector, integrated circuit package, and backplane trace layout, which also tend to be coupled to adjacent transmitters/receivers on the same integrated circuit package. Therefore, it is often the case that a "victim" receiver has access to the digital data that is transmitted on the channels that are the primary sources of crosstalk on that particular channel. Access to this data greatly facilitates crosstalk cancellation via signal processing techniques.

When a line card that includes an integrated circuit with a SerDes device is first inserted into a backplane, the SerDes device may operate in a training phase in order to learn the proper in-service phase offset of each crosstalk channel relative to the channel being trained and, therefore, select the proper symbol response coefficients for cancelling the crosstalk signal(s) from the noisy sampled signal based on the data symbols transmitted over the crosstalk channels. A given backplane may be associated with a set of sequences that are pre-computed response sequences at uniformly distributed phase offsets relative to the in-service phase of the receive clock. The pre-computed response sequences for a given channel may be generated by transmitting a training sequence over a particular crosstalk channel and sampling the signal induced on the channel at various phase offsets relative to the transmit clock of the crosstalk channel. The stored set of sequences may be generated in a lab and distributed along with control software for the particular backplane. The set of sequences may be loaded into a memory on the line card and used to train the SerDes device to perform crosstalk cancellation.

During the training phase, the SerDes device instructs a transmitter for a particular crosstalk channel to transmit a training sequence over the crosstalk channel. The receiver for the channel being trained samples the signal induced on the channel by the crosstalk channel to measure a response sequence to the training sequence. The measured response sequence is compared against the pre-computed response sequences for a plurality of different phase offsets, and a particular phase offset corresponding to the crosstalk channel is selected based on differences between the measured response sequence and the pre-computed response sequences. The selected phase offset is utilized to select a set of symbol response coefficients that may be used to cancel at least a portion of the noise induced on the channel being trained based on the data transmitted over the crosstalk channel. Each channel may cancel noise from one or more dominant crosstalk channels associated with the channel.

In some cases, the frequency of the transmit clock for the crosstalk channel may not be identical to the frequency of the transmit clock for the channel being trained. The transmit clocks can have different frequencies when the transmit clock for the crosstalk channel and the transmit clock for the channel being trained are generated in different clock domains, either within the same integrated circuit using different voltage controlled oscillators or on different integrated circuits when the crosstalk channel is associated with a local transmitter but the channel being trained is associated with a remote transmitter included on a different integrated circuit. When the transmit clock for the crosstalk channel and the transmit clock for the channel being trained have different frequencies, then the phase offset between the two channels will vary over time. In such cases, a frequency offset may be estimated for the two channels and the set of symbol response coefficients may be cycled periodically in order to track the dynamic shift in the phase offset of the two channels.

FIG. 1 illustrates a communications system for transferring data between two devices via a serial communication link, in accordance with one embodiment. As shown in FIG. 1, the communications system 100 includes a backplane 110 and one or more line cards 120. The backplane 110 is implemented as a multi-layer printed circuit board (PCB) that includes a plurality of serial communication channels 114, which may be realized as copper traces on one or more layers of the PCB. The backplane 110 also includes a number of connectors 112 which accept contacts 122 or, alternatively, a mating connector on the line card 120 to couple the communication channels 114 to receivers and transmitters configured to transmit data over the communication channels 114.

Each line card 120 comprises a printed circuit board that supports a number of electrical components for providing an interface to the network. In one embodiment, a line card 120 includes contacts 122, one or more integrated circuit (IC) packages 124, an interface 126, a memory 128, and a controller 130. The controller 130 may be an application specific integrated circuit (ASIC), a micro-controller, a digital signal processor (DSP), an FPGA, a processor such as an ARM® RISC type processor, or various other types of integrated circuits or logic for controlling operations of the line card 120. The controller 130 and/or the one or more IC packages 124 are coupled to the memory 128. Each of the one or more IC packages 124 and/or the controller 130 may include one or more SerDes devices. Again, each SerDes device may comprise a serial-link transmitter and/or a serial-link receiver for transferring data via the communication channels 114 of the backplane 110. The interface 126 may be any type of physical interface that enables an external device to communicate with the line card 120. For example, as shown in FIG. 1, the line card 120 may include a number of RJ45 connectors that implement a portion of the physical layer of an Ethernet interface.

Although not shown explicitly, the backplane 110 and one or more line cards 120 may be enclosed within a chassis that includes a power supply. The power supply may provide a supply voltage to the backplane 110, which provides power to each of the line cards 120 via the connectors 112.

Figure 2A:
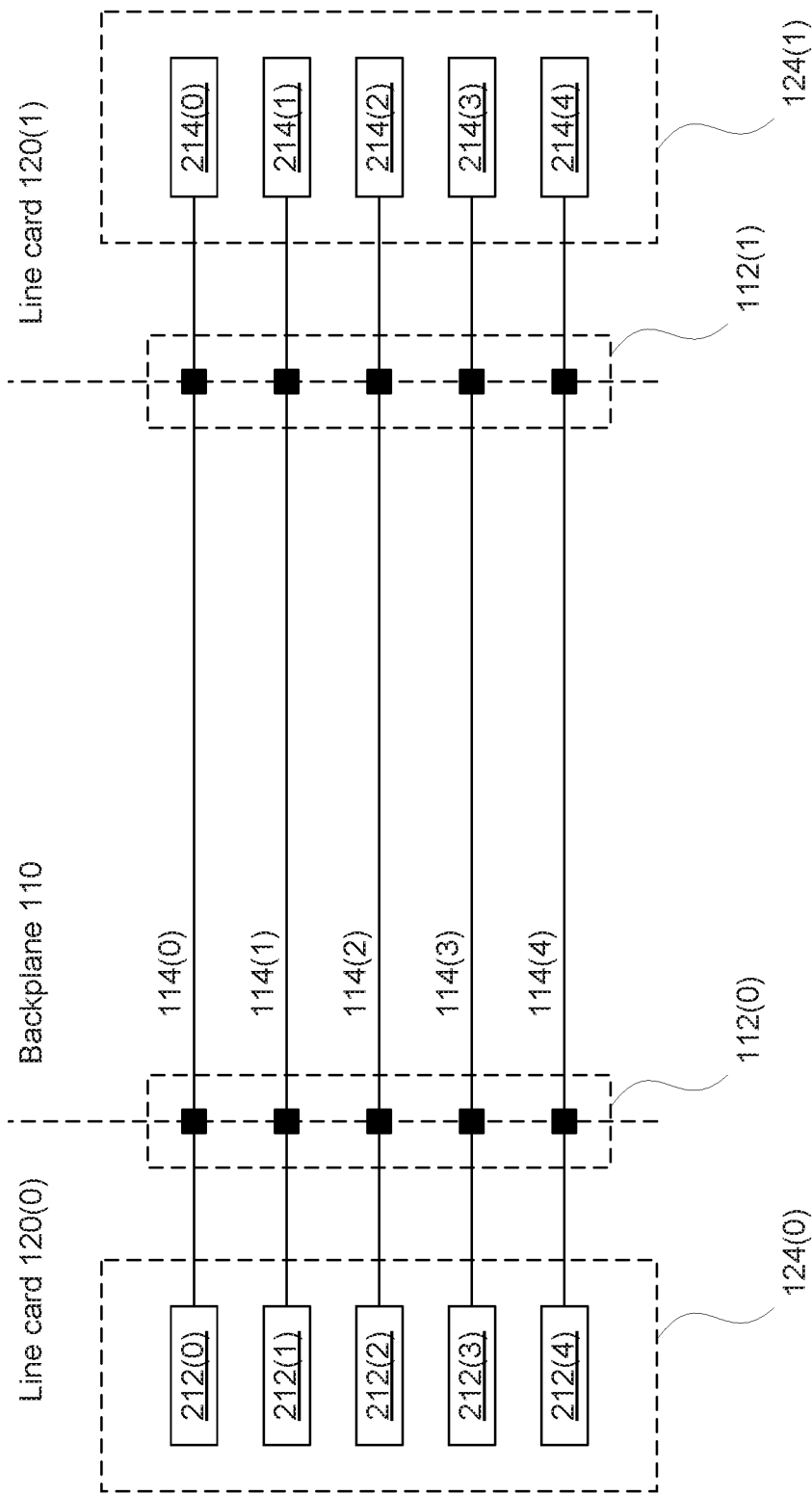
FIG. 2A illustrates a set of serial communication channels of the communications system of FIG. 1, in accordance with one embodiment.

FIG. 2A illustrates a set of serial communication channels 114 of the communications system 100 of FIG. 1, in accordance with one embodiment. As shown in FIG. 2A, a first line card 120(0) and a second line card 120(1) are coupled to a backplane 110. The backplane 110 may implement hundreds of discrete serial communication channels 114, of which five channels, channels 114(0) through 114(4), are shown explicitly in FIG. 2. Each channel 114 may be coupled to a transmitter 212 and receiver 214 in a corresponding pair of IC packages 124.

Although FIG. 2A illustrates each channel 114 as being uni-directional with a transmitter 212 included in a first IC package 124(0) of the first line card 120(0) and a receiver 214 included in a second IC package 124(1) of the second line card 120(1), alternatively some channels 114 may be configured as uni-directional in the opposite direction (e.g., a first channel 114(0) is coupled to a transmitter 212(0) included in the first IC package 124(0) of the first line card 120(0) and to a receiver 214(0) included in the second IC package 124(1) of the second line card 120(1), but a second channel 114(1) may be coupled to a receiver 214 included in the first IC package 124(0) of the first line card 120(0) and to a transmitter 212 included in the second IC package 124(1) of the second line card 120(1) such that the direction of data is in the second channel 114(1) is opposite the direction of data in the first channel 114(0)) or may be configured as bi-directional (e.g., a third channel 114(2) is coupled to a transceiver, both a transmitter 212 and a receiver 214, included in both the first IC package 124(0) of the first line card 120(0) and the second IC package 124(1) of the second line card 120(1) such that data may be transmitted via the channel 114(2) in both directions).

Again, for a given channel, such as channel 114(2), the "victim" receiver 214(2) coupled to that channel 114(2) will receive a signal induced on the channel 114(2) by the transmitter 212(2) coupled to the channel 114(2) as well as noise (i.e., crosstalk) induced on the channel 114(2) by one or more "aggressor" transmitters coupled to the additional channels (e.g., channels 114(0), 114(1), 114(3), and 114(4)). However, for a given backplane configuration (i.e., design), the crosstalk induced on a given channel by each of the other channels coupled to the same line card 120 may be measured and recorded. In other words, the noise induced on channel 114(2) by the aggressor transmitters 212 coupled to channels 114(0), 114(1), 114(3), and 114(4) may be measured in a lab and stored in a memory. The crosstalk induced on the channel 114(2) will depend on the signal being transmitted by the aggressor transmitter and the backplane configuration (i.e., the physical layout of the backplane 110). Because a particular SerDes device included in an IC package 124 has access to the signals being transmitted on other channels in the IC package 124, the estimated noise included in a received signal may be determined and canceled from the received signal, which may be referred to as crosstalk cancellation.

Effective crosstalk cancellation for a particular aggressor transmitter 212 requires knowledge of the T-spaced samples of the symbol response of that crosstalk channel. For example, the victim receiver, such as receiver 214(2), samples the signal on channel 114(2) at a particular frequency $f_0$ and phase $\Phi_v$. The aggressor transmitter, such as transmitter 212(1), transmits a signal on channel 114(1) at the same frequency $f_0$, but at a potentially different phase $\Phi^{(i)}$. The difference in phase $\delta\Phi$ between the victim receiver and the aggressor transmitter is not known until the unit is operational because the in-service phase of the transmit/receive clock for each channel is typically configured using a phase-locked loop (PLL). Consequently, even though the symbol response on a given channel can be sampled in the lab, the phase and frequency at which the response is sampled is important because the difference in phase $\delta\Phi$, referred to as a phase offset, will affect the magnitude of the noise in each sample of the noisy signal. The task of estimating the phase difference between the signal received on a given channel and the signal transmitted on one or more additional channels by aggressor transmitters is not trivial, but can be facilitated by receiver training.

In another example, the victim receiver, such as receiver 214(2), samples the signal on channel 114(2) at a particular frequency $f_0$ and phase $\Phi_v$. The aggressor transmitter, such as transmitter 212(1), transmits a signal on channel 114(1) at a different frequency $f^{(i)}$, which is offset from frequency $f_0$ by a frequency offset $\delta f$. Typically the frequency offset is small as the operational frequency of the transmit clocks is designed to be equal but may vary slightly due to manufacturing differences between different voltage controlled oscillators in different clock domains. It will be appreciated that the difference in phase $\delta\Phi$ between the victim receiver and the aggressor transmitter will vary due to the difference in frequencies of the two transmit clocks. Consequently, the symbol response will vary over time at a frequency that matches the frequency offset. Again, the task of estimating the frequency difference between the signal received on a given channel and the signal transmitted on one or more additional channels by aggressor transmitters is not trivial, but can be facilitated by receiver training.

FIG. 2B illustrates a timing diagram of various signals, in accordance with one embodiment. The timing diagrams are for illustrative purposes to show the dependency of the phase offset between the transmit clock and the receive clock on the symbol response. Signal 272 shows the in-service transmit clock for a particular crosstalk channel, and signal 274 shows the data stream transmitted over the crosstalk channel. As shown in FIG. 2B, the level of signal 274 is transitioned on the rising edge of the transmit clock 272. In other embodiments, the receiver and transmitters may operate at DDR, meaning the signals are transitioned or sampled on both the rising and falling edges of the transmit clock and receive clock, respectively. Signal 276 shows the in-service receive clock for the victim receiver, and signal 278 shows the induced crosstalk on a given channel associated with the victim receiver. The victim receiver has been adapted to sample the signal on the given channel on the rising edge of the in-service receive clock.

It will be appreciated that the crosstalk induced on the given channel is based on the timing of the in-service transmit clock of the aggressor transmitter and not based on the timing of the in-service receive clock. The change in voltage on the crosstalk channel induces a transient signal on the given channel. Thus, the level of the induced crosstalk signal at the rising edge of the in-service receive clock will depend on the phase offset between the in-service transmit clock and the in-service receive clock.

Conceptually, crosstalk cancellation for a given channel may be performed by estimating the phase offset (i.e., $\delta\Phi$) between the in-service clock signals for the victim receiver and each of one or more aggressor transmitters. T-spaced samples of the symbol response of a particular aggressor crosstalk channel may be obtained based on the particular phase offset. Then, with knowledge of the particular symbol transmitted on the crosstalk channel by the aggressor transmitter and knowledge of the particular phase offset between in-service clock signals of the victim receiver and the aggressor transmitter, the noise induced on the channel by the signal transmitted over the crosstalk channel may be estimated and subtracted from the noisy signal to cancel a significant portion of the crosstalk for the given channel.

For example, let the $i^{th}$ aggressor transmitter transmit a data sequence $\{d_k^{(i)}\}$ at transmit clock phase $\Phi^{(i)}=(\Phi_v-\delta\Phi)$; and also let the symbol response of the $i^{th}$ crosstalk channel be $p^{(i)}(t)$. The symbol response represents the normalized induced signal on the channel caused by transmitting a single symbol over the crosstalk channel. The T-spaced samples at phase $\Phi^{(i)}$ are defined as:

$$\{p^{(i)}(kT + \phi^{(i)})\}_{k=0}^{k=L_p-1} \equiv \{p_k^{(i)}\}_{k=0}^{k=L_p-1} \quad (\text{Eq. 1})$$

where L is the length of the symbol response, in samples. The estimate of the noise $n_j^{(i)}$ from the $i^{th}$ aggressor transmitter in the $i^{th}$ sample of the signal collected by the victim receiver is:

$$n_j^{(i)} = \Sigma_{k=0}^{k=L_p-1} p_k^{(i)} d_{j-k}^{(i)} \quad (\text{Eq. 2}),$$

where $\{d_k^{(i)}\}$ is the data symbol sequence transmitted by the aggressor transmitter. It will be appreciated that each symbol transmitted over the crosstalk channel may induce noise in more than one sample of the noisy signal. The symbol response coefficients $\{p_k^{(i)}\}$ may be multiplied by a number of previously transmitted data symbols and summed to find the total noise induced in a particular sample of the noisy signal. The crosstalk cancelled sample $y_j$ is then given by:

$$y_j = r_j - \Sigma_{i=1}^{i=N} n_j^{(i)} \quad \text{(Eq. 3)},$$

where $r_j$ is the $j^{th}$ noisy sample of the noisy signal collected by the victim receiver and N refers to the number of aggressor transmitters.

While, conceptually, crosstalk cancellation using this technique may seem straightforward, a low-complexity implementation of this technique is desired. Examining Equations 1 through 3, it becomes readily apparent that the phase offset of the response sequence is important. While techniques could be implemented to measure the phases of each channel, these techniques may require complex computations to be performed Alternative embodiments may estimate the phase offset of each crosstalk channel using other methods that yield acceptable results while reducing the complexity of the training phase.

Figure 2C:
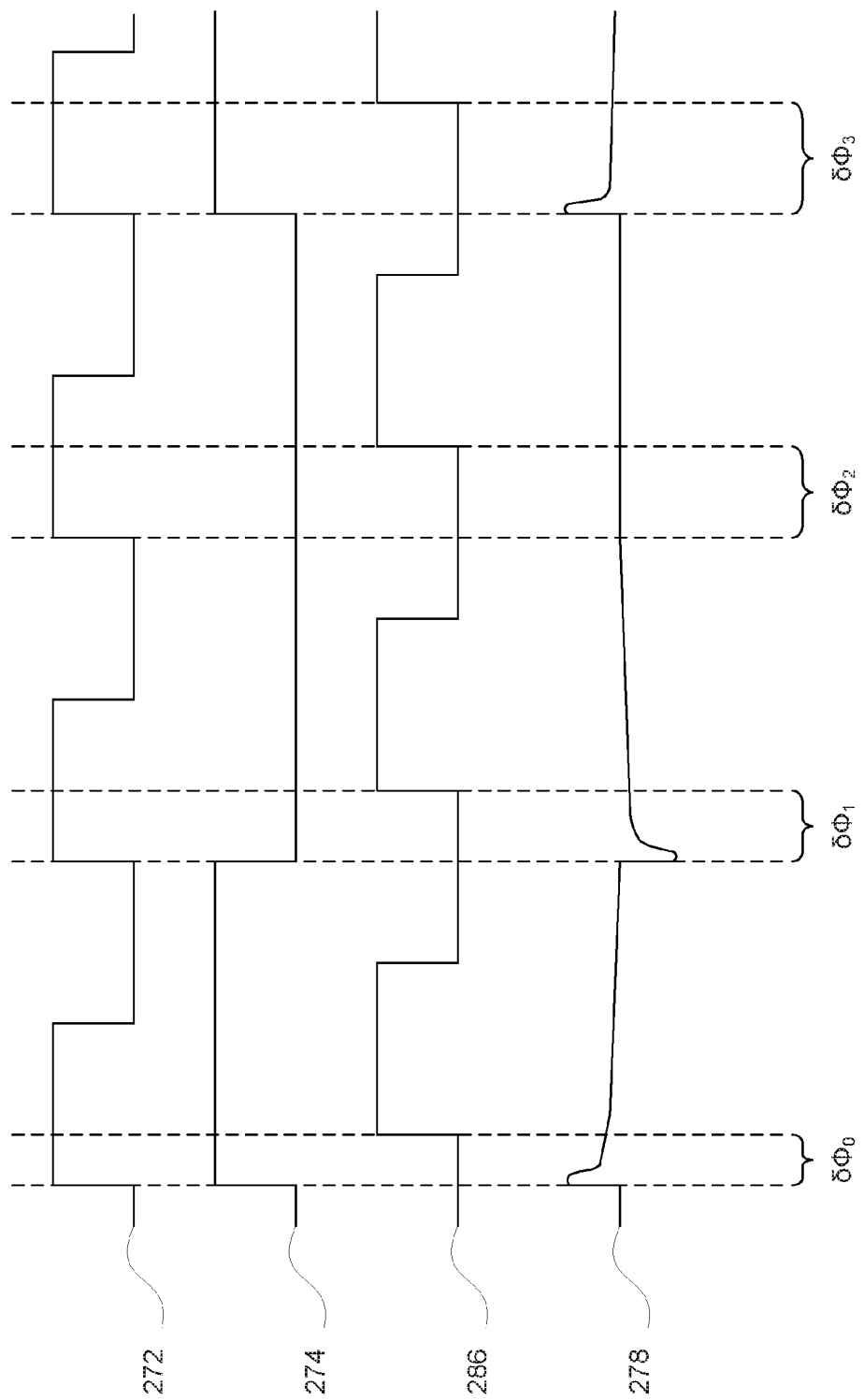
FIG. 2C illustrates a timing diagram of various signals, in accordance with another embodiment.

FIG. 2C illustrates a timing diagram of various signals, in accordance with another embodiment. The timing diagrams are for illustrative purposes to show the dependency of the frequency offset between the transmit clock and the receive clock on the symbol response. Similar to FIG. 2B, signal 272 shows the in-service transmit clock for a particular crosstalk channel, and signal 274 shows the data stream transmitted over the crosstalk channel. Signal 286 shows the in-service receive clock for the victim receiver, and signal 278 shows the induced crosstalk on a given channel associated with the victim receiver. The victim receiver has been adapted to sample the signal on the given channel on the rising edge of the in-service receive clock.

As shown in FIG. 2C, the signal 286 is not operating at the same frequency as the signal 272. Consequently, the phase offset is not constant in time. Instead, the phase offset varies as the in-service transmit clock of the crosstalk channel and the in-service receive clock for the victim receiver go in and out of phase. During a first clock period, the phase offset is $\delta\Phi_0$; during a second clock period, the phase offset is $\delta\Phi_1$; during a third clock period, the phase offset is $\delta\Phi_2$; and during a fourth clock period, the phase offset is $\delta\Phi_3$. As is plain to see, the phase offset is increasing over time due to the slightly different frequency of signal 272 and signal 286. As the phase offset changes, so does the magnitude of the symbol response sampled by the victim receiver because the transition of signal 274 induces the symbol response signal 278 according to the in-service transmit clock and not according to the in-service receive clock. Consequently, measuring the symbol response signal induced by a training sequence at one point in time in order to estimate the phase offset between the in-service transmit clock and the in-service receive clock at that point in time may yield an accurate phase offset corresponding to that point in time, but such phase offset estimate will quickly become inaccurate as the phase offset changes. However, by estimating both the phase offset and the frequency offset of the in-service transmit clock and the in-service receive clock at a particular point in time, the phase offset at subsequent points in time may be calculated. More accurately, an estimated phase offset may be incremented by a fixed amount periodically based on the frequency of the in-service receive clock and the estimated frequency offset between the in-service receive clock and the in-service transmit clock of the aggressor transmitter.

Figure 3A:
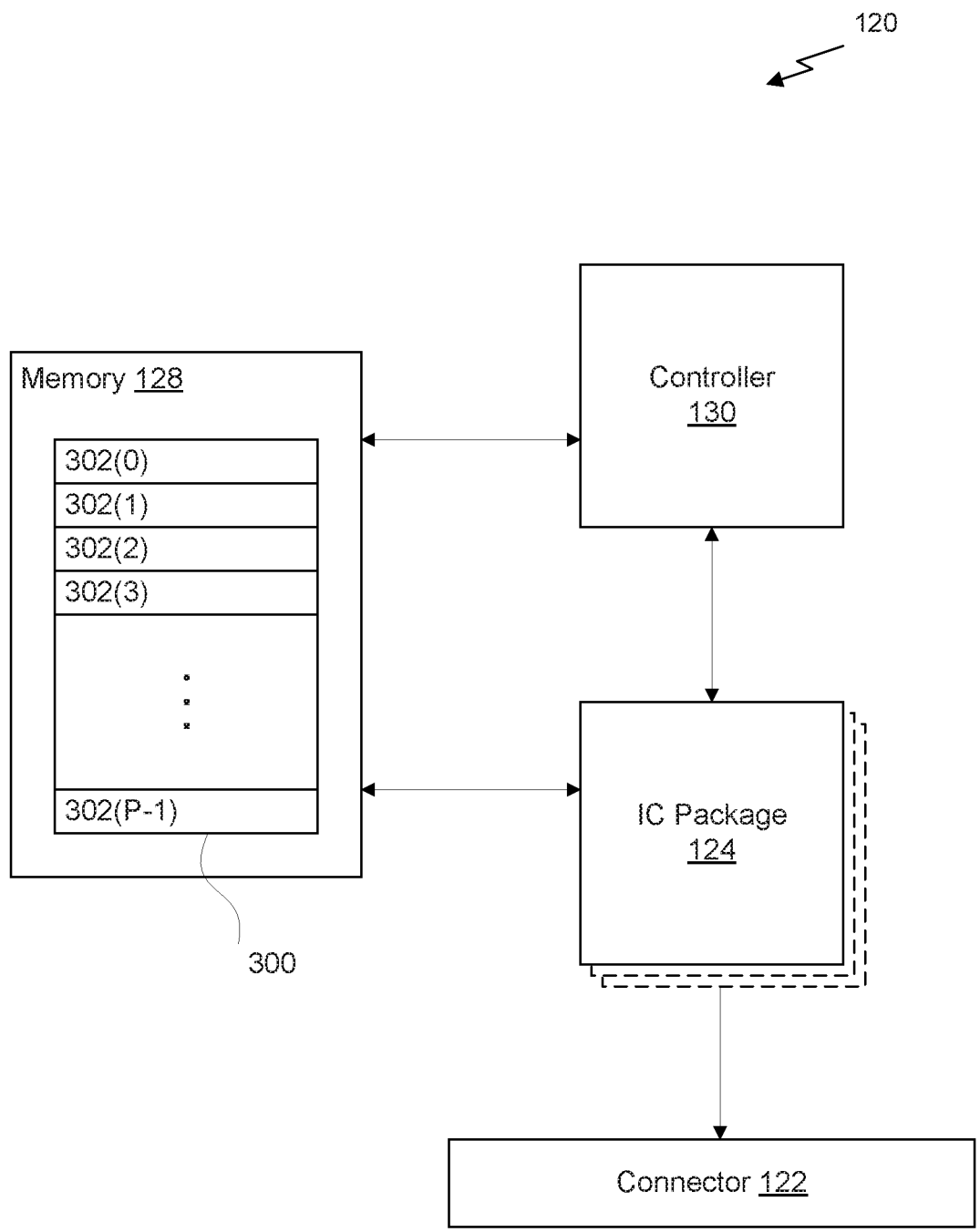
FIG. 3A is a block diagram of the critical components of a line card of FIG. 1 utilized to implement a crosstalk cancellation technique, in accordance with one embodiment.

FIG. 3A is a block diagram of the critical components of a line card 120 of FIG. 1 utilized to implement the crosstalk cancellation technique described above, in accordance with one embodiment. As shown in FIG. 3, the line card 120 includes the connector 122, at least one IC package 124, the memory 128, and the controller 130. The connector 122 couples one or more traces on the line card 120 between a SerDes device included in the IC package 124 and corresponding channels 114 on the back plane 110. In one embodiment, the IC package 124 may be implemented as an integrated circuit encapsulated in a package that is mounted to the line card 120 via surface mount technology (SMT), through-hole mounting, or any other mounting technique well-known in the art. The IC package 124 includes a plurality of transmitters and receivers for communicating with other line cards 120 via the backplane 110. Each SerDes device in the IC package 124 may also include logic for performing crosstalk cancellation. In one embodiment, the IC package 124 is coupled to an external memory 128 via traces on the line card 120. The memory 128 may be a flash memory device such as an EEPROM or NAND-type flash memory, or any other type of non-volatile memory accessible by the controller 130 and/or IC package 124. Alternatively, the memory 128 may be volatile memory such as an SDRAM chip which is loaded with data from a separate non-volatile memory after initial start-up. In alternative embodiments, the IC package 124 may include internal memory (i.e., on-chip RAM) in lieu of or in addition to the memory 128. In some embodiments, the IC package 124 may be a package-on-package (POP) type assembly that includes both the integrated circuit including one or more SerDes devices and a separate memory IC (e.g., SDRAM chip) encapsulated in a single assembly.

The memory 128 (or, alternatively, internal memory of the IC package 124) stores a data structure 300 that includes information required to perform crosstalk cancellation. A training phase may be utilized to estimate the phase offsets between a particular channel and each of the dominant crosstalk channels associated with the particular channel. The training phase takes place during an initialization period shortly after the line card 120 is coupled to the backplane 110. During the training phase, a receiver for each initialized channel is configured by the controller 130 and/or logic included within the IC package 124. The logic for performing the operations of the training phase may be implemented via software, hardware, or a combination of software and hardware. For example, the controller 130 may execute program instructions that perform various operations necessary for implementing the training phase to configure the receivers within a IC package 124. The program instructions may utilize various hardware to perform at least some operations. For example, some instructions may cause signals to be transmitted by one or more transmitters of a local SerDes device included in the IC package 124 on the line card 120. Other instructions may cause signals to be transmitted by one or more transmitters of a remote SerDes device included in an IC package 124 on a different line card 120 coupled to a particular crosstalk channel connected to the local SerDes device. In other embodiments, some operations may be performed by dedicated hardware circuits implemented within the IC package 124 rather than relying on software instructions executed by the controller 130. As used herein, logic may refer to either hardware circuits configured to implement one or more operations, software instructions executed by the controller 130, or some combination of both hardware and software. It will be appreciated that embodiments describing operations performed by the controller 130 may, in alternate embodiments, be implemented within logic included within the IC package 124. In some embodiments, the line card 120 may not include the one or more IC packages 124, and the SerDes devices coupled to the backplane 110 are included within the controller 130. In such embodiments, logic implemented by the controller 130 may be used to configure the SerDes devices within the controller 130.

The controller 130 may cause each aggressor transmitter coupled to a crosstalk channel identified for the channel being trained to transmit a training sequence over the crosstalk channel. The controller 130 may read the training sequence from the memory 128 and cause the training sequence to be transmitted over the crosstalk channel by the aggressor transmitter. In one embodiment, when the aggressor transmitter is included locally in a SerDes device included in the IC package 124 on the line card 120, the controller 130 may transmit the training sequence to the SerDes device to be transmitted by the aggressor transmitter. In another embodiment, when the aggressor transmitter is included remotely in a SerDes device included in an IC package 124 on a remote line card 120, the controller 130 may transmit the training sequence to a corresponding controller 130 included on the remote line card 120, which then transmits the training sequence to the SerDes device to be transmitted over the crosstalk channel via the aggressor transmitter. The victim receiver may then sample the response signal on the channel being initialized. The samples are then analyzed to estimate the phase offset for the crosstalk channel, and corresponding symbol response coefficients associated with the phase offset are selected in order to later cancel noise generated by the crosstalk channel during normal operation.

In one embodiment, the data structure 300 may be an array that has a number of slots corresponding to the number of channels coupled to the one or more IC packages 124 and/or controller 130, where each entry 302 stores crosstalk information for a particular channel. The crosstalk information for a particular channel may include a list of all dominant crosstalk channels associated with the particular channel. For example, each entry 302 may include a linked list data structure that identifies a number N of dominant aggressor transmitters, or the corresponding channels 114, that are the primary source(s) of crosstalk for the particular channel corresponding with the entry 302. In practice, the size of N may be as small as one or two primary crosstalk channels. In some embodiments, the size of N may be 4, 8, or any other integer less than the total number of channels coupled to the IC package 124. For example, if 32 channels are coupled to the IC package 124, then N may be any number between 0 and 31. If none of the channels materially induce noise on a particular channel, then the list of all dominant crosstalk channels may be null. This may be the case when the dominant aggressor transmitters for the particular channel are connected to a different IC package 124 or coupled to a different line card 120 such that crosstalk cancellation is not practical because the IC package 124 has no information about the data transmitted over the crosstalk channel. In practice, this situation can be minimized by careful design considerations of the backplane 110. The effectiveness of a particular size of N may be related to the design of the backplane 110 utilized in a particular deployment. Although a particular channel may have more than N crosstalk channels, canceling noise from the most dominant crosstalk channels may yield a significant improvement in the BER for the channel.

For each dominant crosstalk channel, the crosstalk information also includes a set of T-spaced symbol response coefficients corresponding to a number M of different phase offsets. The number of phase offsets are uniformly distributed over a full baud duration with offset $\delta_\Phi = T/M$. For the $i^{th}$ crosstalk channel, the set of T-spaced symbol response coefficients are given by:

$$\{p^{(i)}(kT+m\delta_\Phi)\}_{k=0}^{k=L_p-1} = \{p_k^{(i)}(m)\},$$
$$m = \{0,1,2,\ldots,M-1\} \quad \text{(Eq. 4)}$$

As an example, for M equal to 4, which corresponds to phase offsets at multiples of 90 degrees, the four sets of symbol response coefficients are given in Table 1.

TABLE 1

| |
|---|
| $\{p^{(i)}(kT)\} = p^{(i)}(0), p^{(i)}(T), p^{(i)}(2T), \ldots, p^{(i)}((L_p-1)T)$ |
| $\{p^{(i)}(kT + \delta_\phi)\} = p^{(i)}(\delta_\phi), p^{(i)}(T + \delta_\phi), p^{(i)}(2T + \delta_\phi), \ldots, p^{(i)}((L_p-1)T + \delta_\phi)$ |
| $\{p^{(i)}(kT + 2\delta_\phi)\} = p^{(i)}(2\delta_\phi), p^{(i)}(T + 2\delta_\phi), p^{(i)}(2T + 2\delta_\phi), \ldots, p^{(i)}((L_p-1)T + 2\delta_\phi)$ |
| $\{p^{(i)}(kT + 3\delta_\phi)\} = p^{(i)}(3\delta_\phi), p^{(i)}(T + 3\delta_\phi), p^{(i)}(2T + 3\delta_\phi), \ldots, p^{(i)}((L_p-1)T + 3\delta_\phi)$ |

Effective crosstalk cancellation may be performed with just a few terms and a small number of estimated phase offsets; e.g., $L_p \sim 5$ and M=8 (corresponding to 45° phase offsets), M=12 (corresponding to 30° phase offsets), or M=16 (corresponding to 22.5° phase offsets). The smaller the selected values of $L_p$ and M, the lower the storage required for each entry 302.

The crosstalk information also includes the pre-computed response sequences based on the T-spaced symbol response coefficients when excited by a training sequence. Let the training sequence of length $L_i$ be given as $\{I_k\}_{k=0}^{k=L_i-1}$. Then, for the $m^{th}$ phase offset of the $i^{th}$ crosstalk channel, the sequence shown in Equation 5 is stored in the memory 128.

$$\{A_k^{(i)}(m)\}_{k=0}^{k=L_i+L_p-2} = \{\Sigma_{j=0}^{j=L_p-1} p_j^{(i)}(m) I_{k-j}\} \quad \text{(Eq. 5)}$$

The training sequence $(I_k)$ may be any known sequence of symbols. The symbol response coefficients $\{p_j^{(i)}(m)\}$ for a given phase offset m, along with the known training sequence $\{I_k\}$ may be used to pre-compute the sampled response collected by the victim receiver when the training sequence is transmitted by the aggressor transmitter. The sampled response sequence $\{A_k^{(i)}(m)\}$ for each of the M different phase offsets may be stored in the memory 128.

In one embodiment, a pseudo-random sequence, such as PRBS7, is selected as the training sequence. The pseudo-random sequence varies the frequency of the signal transmitted on the crosstalk channel over the length of the pseudo-random sequence which may provide a better response that more accurately reflects real-time operation than simply using an oscillating training sequence at a fixed frequency of oscillation.

In order to estimate the particular phase offset of a given crosstalk channel during operation, the aggressor transmitter for the crosstalk channel is instructed to transmit the training sequence on the crosstalk channel according to the transmit clock of the crosstalk channel at the aggressor transmitter's in-service transmit phase. The transmit clock of the crosstalk channel may have a phase offset relative to the receive clock of the channel being configured. The victim receiver samples the signal on the channel being configured according to the receive clock of the channel to collect the measured response $\{B_k^{(i)}\}$ to the training sequence at an in-service receive phase. A comparison of the measured response may then be made against the plurality of pre-computed response sequences $\{A_k^{(i)}(m)\}$ for each of the plurality of different phase offsets m according to a variety of metrics. The estimated phase offset may then be selected based on a particular metric.

A metric value may be computed for each of the plurality of phase offsets m according to different criteria. The metric values may then be compared to determine which phase offset is closest to the relative phase difference between the in-service transmit phase of the transmit clock of the crosstalk channel and the in-service receive phase of the receive clock of the channel being configured. In one embodiment, the comparison of the measured response to the stored pre-computed response sequence may be made by calculating a squared Euclidean norm metric for the error signal corresponding to each phase offset. In other words, the metric values for each phase offset m may be calculated according to Equation 6:

$$M1^{(i)}(m) = \Sigma_{k=0}^{k=L_i+L_p-2}(A_k^{(i)}(m) - A_k^{(i)}(m))^2 \quad \text{(Eq. 6)}$$

Consequently, the phase offset m that best approximates the in-service transmit phase of the crosstalk channel is the phase offset m that minimizes metric M1. The metric M1 may be calculated in parallel for each phase offset m in the plurality of phase offsets. In one embodiment, the IC package 124 includes logic for calculating the metric M1 for each of the different phase offsets. The logic may include an arithmetic logic unit (ALU) for performing subtraction, multiplication, and addition operations for calculating the metric M1. The logic may also include comparators for determining which phase offset n minimizes the metric M1. The SerDes device included in the IC package 124 is then configured by the logic to utilize the symbol response coefficients $\{p_j^{(i)}(m)\}$ for the selected phase offset n to perform crosstalk cancellation. In another embodiment, the SerDes device included in the IC package 124 is utilized to collect the measured response $\{B_k^{(i)}\}$ and store the samples of the measured response in the memory 128. The controller 130 is then used to calculate the metric M1 and determine which phase offset m minimizes the metric M1. Once the phase offset m that minimizes M1 has been determined, the controller 130 may configure the SerDes device included in the IC package 124 to utilize the symbol response coefficients $\{p_j^{(i)}(m)\}$ for the selected phase offset m to perform crosstalk cancellation.

A different metric may be used in order to simplify the calculation of metric M1. In another embodiment, the computational burden of calculating the metric may be reduced by using an error $l_1$-norm ("Manhattan norm") metric, as shown in Equation 7:

$$M2^{(i)}(m) = \Sigma_{k=0}^{k=L_i+L_p-2}|A_k^{(i)}(m) - B_k^{(i)}(m)| \quad \text{(Eq. 7)}$$

The metric M2 may be preferred over metric M1 in order to reduce the complexity of the calculation and, therefore, the complexity of the logic included in the IC package 124 (i.e., the calculation of metric M2 only requires addition and subtraction operations and not multiplication operations such as with metric M1). However, if the metric is being computed using the controller 130, and the controller 130 already has logic for easily performing advanced arithmetic operations, then metric M1 may be preferred over metric M2.

Once the phase offset m that approximates the phase difference between the in-service transmit phase of the transmit clock of the crosstalk channel and the in-service receive phase of the receive clock of the channel being configured has been determined, then crosstalk cancellation may be performed according to Equations 2 and 3 using knowledge of the data transmitted on the crosstalk channel and the symbol response coefficients $\{p_j^{(i)}(m)\}$ for the selected phase offset m. It will be appreciated that the data symbols transmitted on a given crosstalk channel may be known by the IC package 124 because either: (1) the IC package 124 includes a transmitter 212 that is converting the symbols to a signal transmitted over the crosstalk channel; or (2) the IC package 124 includes a receiver 214 that is sampling the signal transmitted over the crosstalk channel to determine the symbols.

Figure 3B:
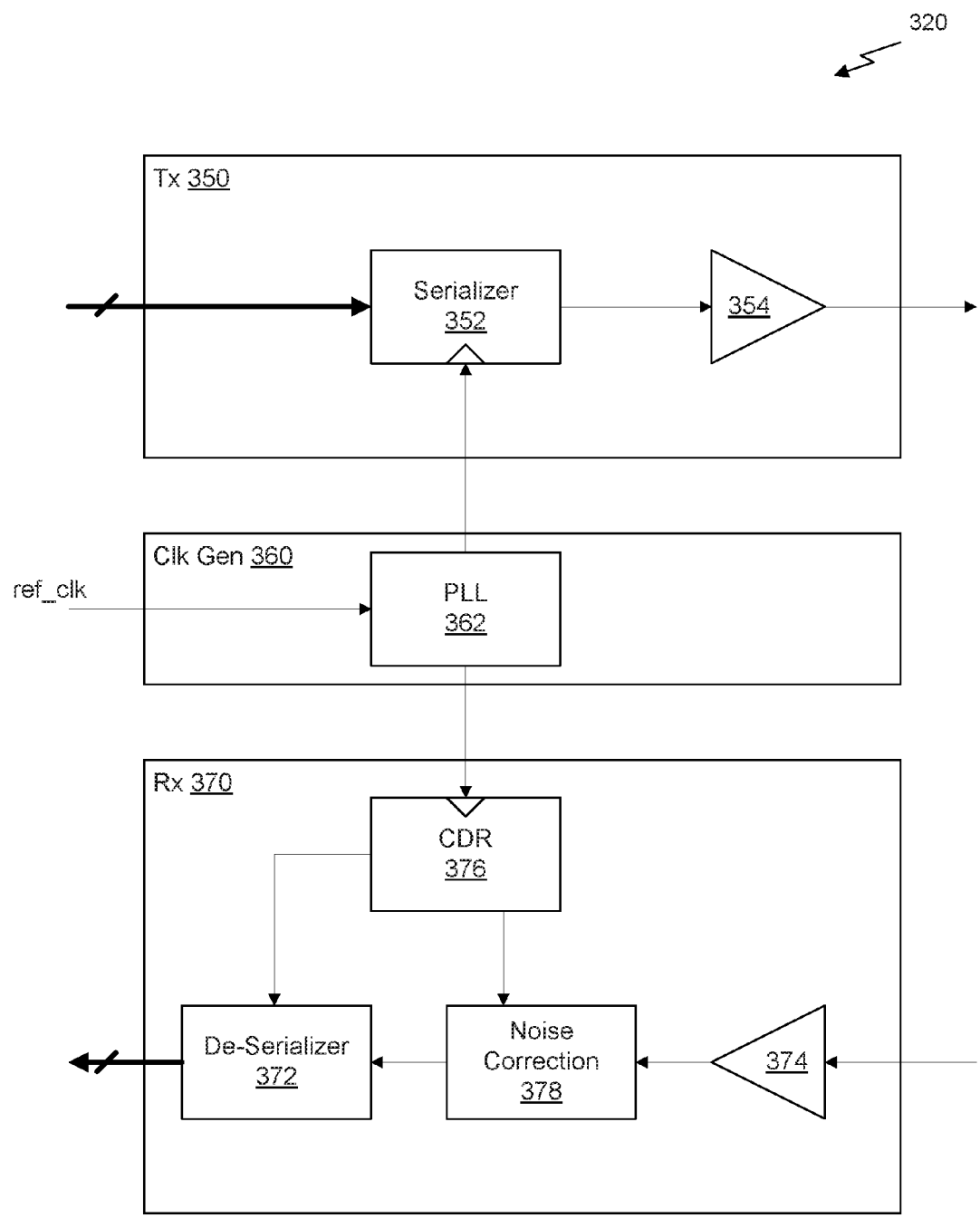
FIG. 3B is a block diagram of a SerDes device, in accordance with one embodiment.

FIG. 3B illustrates a SerDes device 320, in accordance with one embodiment. The SerDes device 320 may be included in the IC package 124 and/or the controller 130. As shown in FIG. 3B, the SerDes device 320 includes a transmitter 350, a clock generation circuit 360, and a receiver 370. The clock generation circuit 360 receives a reference clock and generates clocks for the transmitter 350 and/or receiver 370. The transmitter 350 receives parallel data, which is serialized by a serializer 352 using an in-service transmit clock from a PLL 362 of the clock generation circuit 360. The serialized data is transmitted to a driver 354 that induces a signal on a corresponding communications channel. The receiver 370 includes an ADC 374 that samples the signal on a corresponding communications channel. The samples from the sampled signal are received by a noise correction circuit 378 which may adjust the samples. The corrected samples are then collected into parallel data words by a de-serializer 372. The clock and data recovery (CDR) unit 376 may adjust a clock signal received from the clock generation circuit 360 to generate adjusted clock signals utilized by the noise correction circuit 378 and de-serializer 372. For example, the CDR unit 376 may increase the frequency of the clock signal generated by the clock generation circuit 360 to up-sample the signal on the communications channel or adjust a phase of the clock signal generated by the clock generation circuit 360 in order to sample the signal based on an adjusted phase.

In one embodiment, the noise correction circuit 378 of the receiver 370 is configured to receive data symbols transmitted over one or more crosstalk channels and adjust the samples of the received signal to correct for estimated crosstalk. The noise correction circuit 378 may be configured by configuring a number of registers in the noise correction circuit 378 to store values of the symbol response coefficients $\{p_j^{(i)}(m)\}$ for the selected phase offset m of a particular crosstalk channel in order to cancel crosstalk from that channel based on the data symbols transmitted over that channel.

In some embodiments, the SerDes device 320 may include additional complexity not shown explicitly in FIG. 3B. For example, the transmitter 350 may include a feed forward equalizer that compensates for inter-symbol interference in the transmitted signal. As another example, the receiver 370 may include a DAC for generating an analog signal to compare with the signal received via the communication channel in order to estimate an energy difference between the signals. As yet another example, the receiver 370 may also include a decision feedback equalizer (DFE) in order to compensate for inter-symbol interference, or other types of circuitry commonly found in conventional SerDes devices 320.

Figure 4:
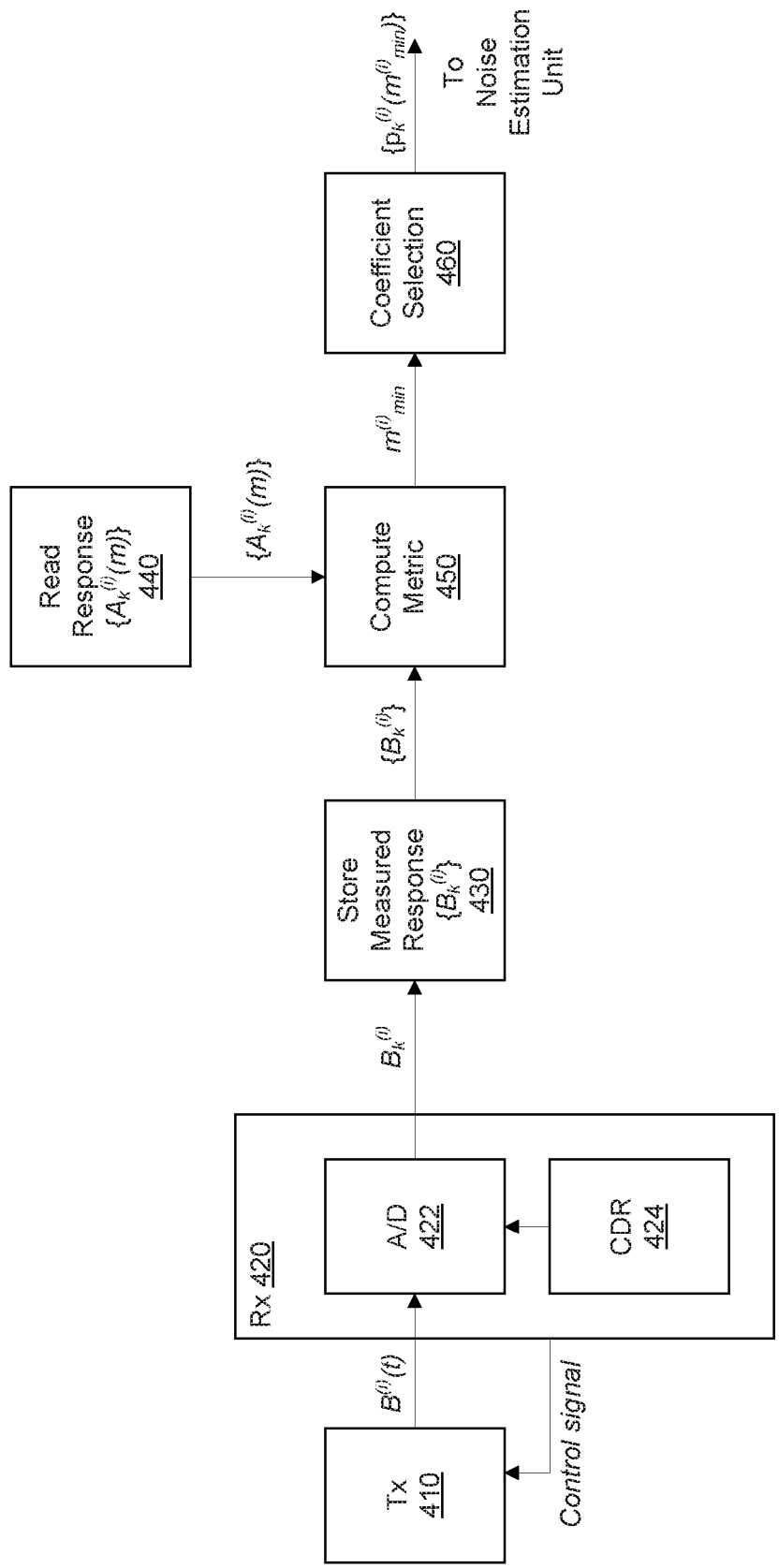
FIG. 4 is a conceptual illustration of the functional blocks for selecting a set of symbol response coefficients during a training phase of the SerDes device, in accordance with one embodiment.

FIG. 4 is a conceptual illustration of the functional blocks for selecting a set of symbol response coefficients during a training phase of the SerDes device 320, in accordance with one embodiment. The functional blocks in FIG. 4 merely represent complex operations performed by one or more hardware units described in the previous Figures and should not be construed as representing actual hardware units. The functional blocks are shown merely to illustrate operations performed to train a serial communication link.

As shown in FIG. 4, at block 410, an aggressor transmitter is instructed by a victim receiver to transmit a training sequence $\{I_k\}$ on the crosstalk channel according to the in-service transmit phase of the transmit clock for the aggressor transmitter. At block 420, the victim receiver samples the signal transmitted over the crosstalk channel $\{B^{(i)}(t)\}$ to collect the measured response $\{B_k^{(i)}\}$ via an analog-to-digital converter (ADC) 422. The ADC 422 may sample the measured response $\{B_k^{(i)}\}$ based on the in-service receive phase of the receive clock for the victim receiver as generated by the clock and data recovery (CDR) unit 424. At block 430, the measured response $\{B_k^{(i)}\}$ samples are stored in a memory, such as memory 128. At block 440, the plurality of sample response sequences $\{A_k^{(i)}(m)\}$ for each of the plurality of different phase offsets m and the measured response $\{B_k^{(i)}\}$ is read from a memory and, at block 450, the plurality of pre-computed response sequences $\{A_k^{(i)}(m)\}$ and the measured response samples $\{B_k^{(i)}\}$ are received at a computation unit. The computation unit may be logic included in the IC package 124 or a separate and distinct controller 130 that executes instructions. The computation unit calculates a metric value corresponding to each phase offset m, and the different metric values are compared to determine a phase offset m that minimizes the metric. At block 460, the selected phase offset m is utilized to configure the SerDes device 320 to select the set of symbol response coefficients $\{p_k^{(i)}(m)\}$ utilized for performing crosstalk cancellation.

Figure 5:
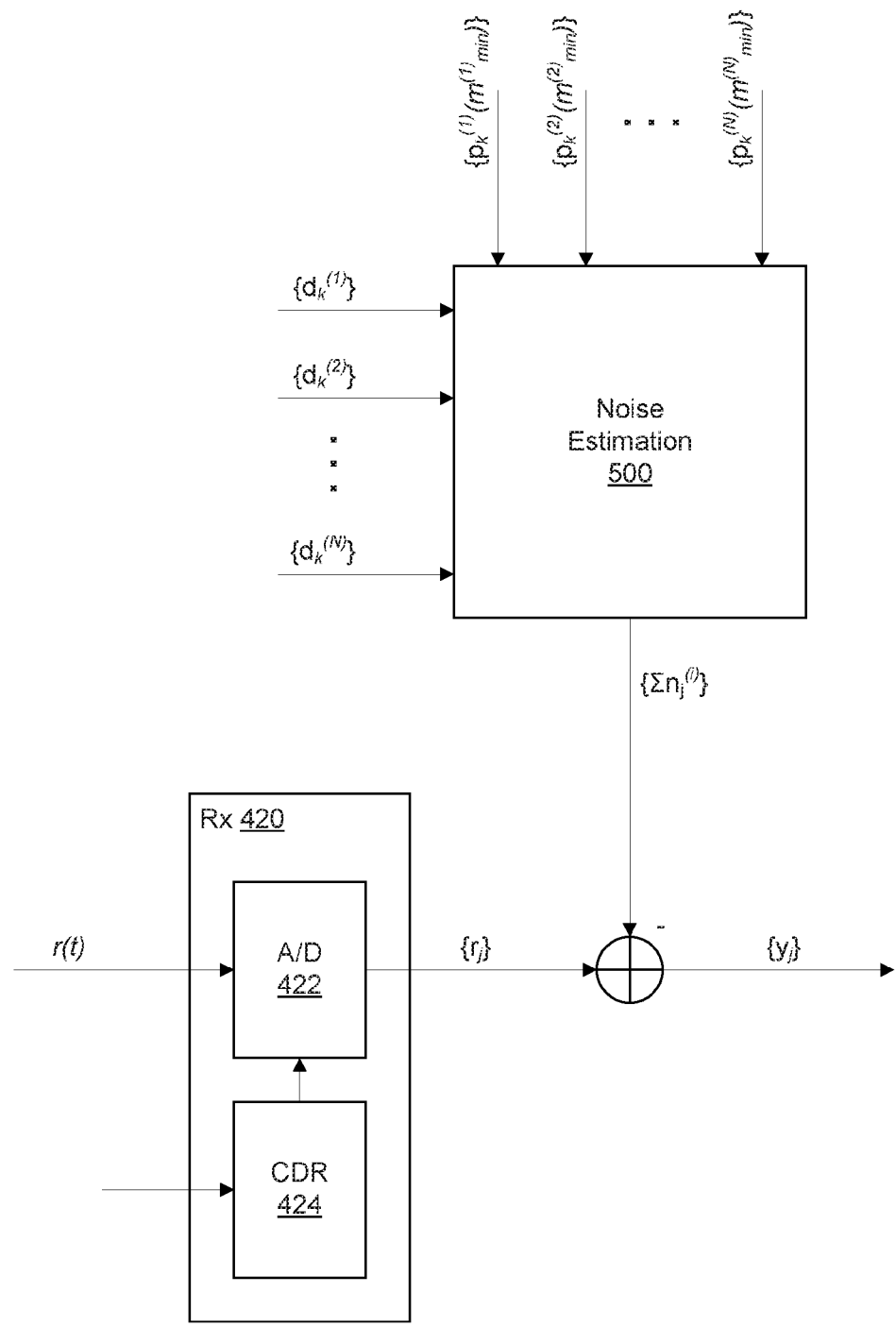
FIG. 5 illustrates a noise estimation unit for performing crosstalk cancellation during a normal operating phase of the SerDes device utilizing a set of symbol response coefficients, in accordance with one embodiment.

FIG. 5 illustrates a noise estimation unit 500 for performing crosstalk cancellation during a normal operating phase of the SerDes device 320 utilizing a set of symbol response coefficients, in accordance with one embodiment. As shown in FIG. 5, a noise estimation unit 500 receives a set of symbol response coefficients $\{p_k^{(i)}(m_{min}^{(i)})\}$ for a particular phase offset m for each of N dominant crosstalk channels, where i=1, . . . , N. The noise estimation unit 500 also receives the data symbols $\{d_k^{(i)}\}$ transmitted over N$^r$ dominant crosstalk channels, where i=1, . . . , N. Again, the data symbols $\{d_k^{(i)}\}$ are known because the IC package 124 may also include a receiver coupled to each of the dominant crosstalk channels that samples the signal transmitted by the aggressor transmitters over these channels. Alternatively, the IC package 124 may include a transmitter coupled to each of the dominant crosstalk channels that transmits the signal over these channels and, consequently, the symbols being transmitted are known a priori.

The noise estimation unit 500 generates a sequence of noise estimates $\Sigma_{i=1}^{i=N} n_j^{(i)}$ for each of j samples of a discrete noisy signal $\{r_j\}$, which is sampled by the victim receiver. The noise estimates are subtracted from corresponding discrete noisy samples to generate a set of crosstalk cancelled samples $\{y_j\}$. The crosstalk cancelled samples $\{y_j\}$ may then be demodulated to convert the samples into data symbols. The noise estimation unit 500 is included in the IC package 124 to perform crosstalk cancellation prior to converting the crosstalk cancelled samples to data symbols stored in a memory 128, In one embodiment, the noise estimation unit 500 may be implemented in the noise correction circuit 378.

It will be appreciated that the noise estimation unit 500 is configured to cancel noise from a continuously sampled signal. Each time the signal is sampled, the j previous data symbols $\{d_k^{(i)}\}$ are updated for each of the N dominant crosstalk channels, and used to compute a new noise estimate in the sequence of noise estimates $\{\Sigma n_j^{(i)}\}$. The number of previous symbols j that are used to cancel crosstalk may be limited since the symbol response caused by a particular symbol typically decays to zero over a short time period such that symbols transmitted over the crosstalk channel j+1 baud periods prior to the current symbol effectively contribute insignificant noise to the current symbol being sampled.

It will be appreciated that the frequency of the in-service receive clock of the victim receiver and the frequency of the in-service transmit clock of the aggressor transmitter may be slightly different if the clocks are generated by two different clock domains, such as clocks generated by local oscillators on two different chips. In this case, the phase offset between the in-service receive clock and the in-service transmit clock will vary over time as the clocks move in and out of phase. In one embodiment, the SerDes device 320 may be configured to cancel noise by cycling through the pre-calculated symbol response coefficients $\{p_j^{(i)}(m)\}$ for the plurality of phase offsets m. In other words, a first set of pre-calculated symbol response coefficients is selected and used for noise cancellation during a fixed number of baud durations, and then the next set of pre-calculated symbol response coefficients is selected and used for noise cancellation during the next fixed number of baud durations, and so on as all of the pre-calculated symbol response coefficients are cycled through in a repeating manner.

A frequency offset between the in-service receive clock and the in-service transmit clock may be measured in order to determine the fixed number of baud durations at which to switch the pre-calculated symbol response coefficients used for noise cancellation. In one embodiment, the CDR unit 376 can be used to calculate the frequency offset, as the CDR unit 376 will be forced to advance or retard one step every S baud durations, where the CDR unit 376 is implemented using R steps per baud duration T (e.g., R=32). The fixed number of baud durations F between switching the pre-calculated symbol response coefficients is given as:

$$F = \frac{RS}{M} \quad \text{(Eq. 8)}$$

Figure 6:
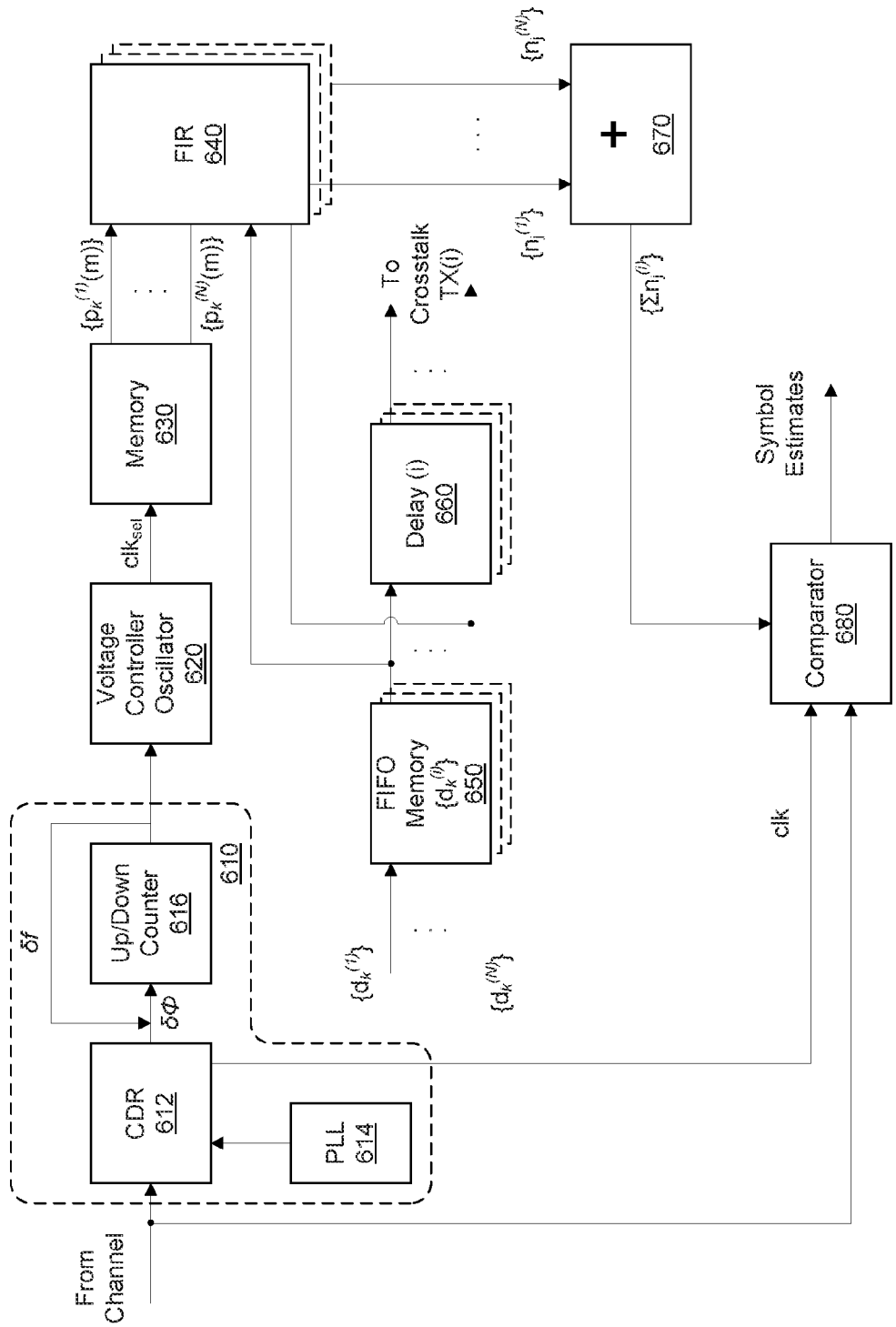
FIG. 6 is a conceptual illustration of the functional blocks for performing crosstalk cancellation with frequency offset compensation, in accordance with another embodiment.

FIG. 6 is a conceptual illustration of the functional blocks for performing crosstalk cancellation with frequency offset compensation, in accordance with another embodiment. Again, a frequency offset between the in-service receive clock of the victim receiver and the in-service transmit clock of the aggressor transmitter may exist when the two clocks are associated with different clock domains, which may happen when the transmitter associated with a given channel coupled to the victim receiver is in a different clock domain than the aggressor transmitter of the crosstalk channel. In such cases, the phase offset between the in-service receive clock of the victim receiver and the in-service transmit clock of the aggressor transmitter will vary periodically.

In one embodiment, the CDR unit 376 included in the receiver 370 of a SerDes device 320 may be a 2$^{nd}$ order CDR unit 610. The CDR unit 610 includes a 1$^{st}$ order CDR unit 612, a phase-locked loop (PLL) 614, and an up/down counter 616. The CDR unit 612 and the PLL 614 are utilized to lock the in-service receive clock to the in-service transmit clock of the serial communication channel so that data can be sampled on the serial communication channel. The 2$^{nd}$ order CDR unit 610 functions to accommodate a frequency offset between the in-service receive clock of the victim receiver and the in-service transmit clock of the serial communication channel by advancing or retarding the phase of the in-service receive clock every S number of baud durations. The 1$^{st}$ order CDR unit 612 generates the in-service receive clock (clk), which is transmitted to the comparator 680 for converting the signal received over the serial communication channel into a series of symbol estimates.

The $1^{st}$ order CDR unit 612 also generates a phase offset estimate δΦ that indicates a number of steps per baud duration to advance or retard the phase of the in-service receive clock. In one embodiment, the phase offset may take a value in the set of {−1, 0, 1} that indicates that the phase of the in-service receive clock should be retarded by one step, neither retarded nor advanced, or advanced by one step, respectively. The phase offset may be input to an up/down counter 616, which accumulates the phase offset over time. The accumulated phase offset stored in the up/down counter 616 is proportional to the frequency offset (δf) between the in-service receive clock of the victim receiver and the source clock received by the CDR 612 from a clock generation circuit 360.

It will be appreciated that the frequency offset measured by the $2^{nd}$ order CDR unit 610 is matched to the frequency offset between the in-service receive clock of the victim receiver and the in-service transmit clock of the aggressor transmitter only when the in-service transmit clock of the aggressor transmitter and the source clock of the $1^{st}$ order CDR unit 612 originate from a common clock fan-out in the clock generation circuit 360. However, in many cases, the dominant crosstalk channels contributing to the largest portion of the noise for a given serial communication channel are associated with aggressor transmitters located in the same IC as the SerDes device 320, which also share a source clock signal from a common clock generation circuit 360. In such cases, the frequency offset measured by the $2^{nd}$ order CDR unit 610 is matched to the frequency offset between the in-service receive clock of the victim receiver and the in-service transmit clock of the aggressor transmitter, and can be leveraged to perform more accurate crosstalk cancellation.

The value output by the up/down counter 616 is utilized to provide a feedback signal to the $1^{st}$ order CDR unit 612 to adjust the clock signal generated for sampling the signal on the serial communication channel. The value output by the up/down counter 616 is also utilized to set the frequency of a voltage controlled oscillator (VCO) 620 that generates a clock signal of a frequency that matches the frequency for switching between different sets of symbol response coefficients. In other words, the frequency of the clock signal generated by the VCO 620 is set such that one cycle of the clock signal is equal to the fixed number F of baud durations calculated in Equation 8, In one embodiment, a rising transition of the clock signal generated by the VCO 620 triggers a new set of symbol response coefficients to be read from a memory 630 and stored in a set of registers to be used by a finite impulse response (FIR) filter 640 during noise cancellation. In another embodiment, a rising transition of the clock signal generated by the VCO 620 increments a counter that stores a value related to an index m. The index m is used to configure a multiplexor to select a particular set of symbol response coefficients from memory 630 based on the value of the index m. For example, the memory 630 may be a set of registers configured to store each set of symbol response coefficients. A particular set of symbol response coefficients in a corresponding set of registers are connected to the input of a finite impulse response (FIR) filter 640 by a multiplexor controlled by the index m.

It will be appreciated that a number of different FIR filters 640 may be implemented, one FIR filter 640 per crosstalk channel. Thus, a different set of symbol response coefficients for each crosstalk channel in N crosstalk channels may be read from the memory 630 and transmitted to a corresponding FIR filter 640. During a normal operating phase of the SerDes device 320, data symbols $\{d_k^{(i)}\}$ from each of the N crosstalk channels are stored in a FIFO memory 650 as the data symbols are prepared for transmission over the corresponding crosstalk channel. The data symbols for each crosstalk channel may be read, asynchronously, from the FIFO memory 650 and input to a corresponding FIR filter 640.

In one embodiment, the FIFO memory 650 for each crosstalk channel is located in the aggressor transmitter circuit for the crosstalk channel. The data symbols read into the FIR filter 640, therefore, must be routed from the FIFO memory 650 in each aggressor transmitter to the FIR filter 640 implemented in the victim receiver. Consequently, each aggressor transmitter may also include a variable delay unit 660 that can delay transmission of a data symbol over the crosstalk channel when the symbol is read out of FIFO memory 650 in order to be utilized to generate the noise estimate for a victim receiver. This delay unit 660 may compensate for a time required to transmit the data symbol to the FIR filter 640 and configure the FIR filter 640 to generate a noise estimate based on that data symbol. In other words, the delay unit(s) 660 align the noise estimates generated by the FIR filter(s) 640 with the signals for the data symbol transmitted over the crosstalk channel(s).

Each FIR filter 640 utilizes a set of symbol response coefficients and corresponding data symbols to perform noise cancellation and generate a noise cancellation signal $\{n_j^{(i)}\}$. The noise cancellation signals corresponding to a plurality of crosstalk channels may be combined in an accumulation unit 670 to generate an accumulated noise estimate $\{\Sigma n_j^{(i)}\}$ for the serial communication channel corresponding to the N crosstalk channels. The accumulated noise estimate is utilized by the comparator 680 as a comparator offset control signal in order to implement noise cancellation while generating symbol estimates based on the noisy signal. The comparator 680 generates symbol estimates by demodulating the noisy signal from the serial communication channel based on the in-service receive clock generated by the $2^{nd}$ order CDR 610 and the comparator offset control signal from the accumulation unit 670. In one embodiment, the comparator 680 receives an analog signal from the serial communication channel, samples the analog signal using an analog to digital converter (ADC), and subtracts a digital value of the comparator offset control signal from the sample before determining a level of the data symbol (e.g., logic high or logic low). In another embodiment, the comparator 680 receives an analog signal from the serial communication channel and combines the analog signal with an analog comparator offset control signal before comparing a level of the combined signal with a reference voltage. In such an embodiment, the comparator offset control signal is an analog signal generated by the accumulation unit 670, which may be generated by summing the discrete digital noise estimates $\{n_j^{(i)}\}$ for each crosstalk channel and then using the accumulated noise estimate for the serial communication channel to drive a digital-to-analog converter (DAC) to generate the analog comparator offset control signal. In yet another embodiment, the comparator 680 receives a digital sample of the signal on the serial communication channel that has been sampled by an ADC. In such embodiments, the comparator offset control signal is also a digital value that is subtracted from the sampled value before demodulating the signal in a digital domain.

It will be appreciated that the VCO 620 generates a clock that cycles different sets of symbol response coefficients into the FIR filter(s) 640 at a rate determined by the frequency offset generated by the $2^{nd}$ order CDR 610. Consequently, the initial set of symbol response coefficients is dynamically adjusted based on the frequency offset between the in-service receive clock generated by the $2^{nd}$ order CDR 610 and the in-service transmit clock of the aggressor transmitter associated with the crosstalk channel. Without this dynamic adjustment, such frequency offsets would soon render the initial training phase pointless as the optimal set of symbol response coefficients does not match the phase offset between the two clocks. Of course, if the in-service receive clock and the in-service transmit clock are the same frequency, then there should be no change to the initial set of symbol response coefficients selected for each FIR 640.

Figure 7:
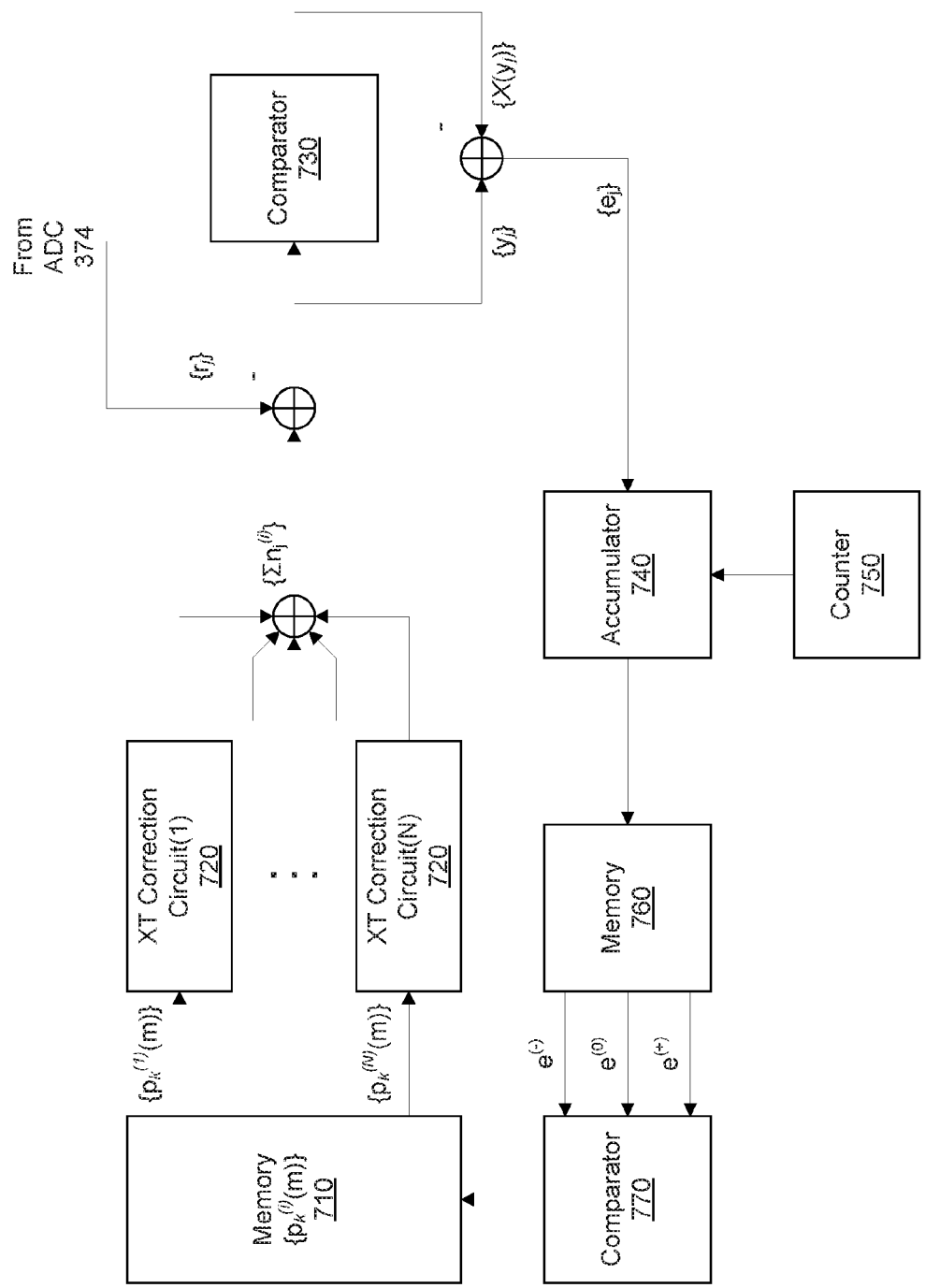
FIG. 7 is a conceptual illustration of the functional blocks for performing crosstalk cancellation with dynamic phase offset compensation, in accordance with another embodiment.

FIG. 7 is a conceptual illustration of the functional blocks for performing crosstalk cancellation with dynamic phase offset compensation, in accordance with another embodiment. Although frequency offset calculated by the CDR unit 610 is useful for changing the symbol response coefficients to account for a periodic change in the phase offset between the in-service receive clock of the victim receiver and the in-service transmit clock of the aggressor transmitter, there are some situations where the phase offset does not change periodically. For example, during normal operation of the serial communication link, the phase offset between the in-service receive clock of the victim receiver and the in-service transmit clock of the aggressor transmitter may change due to temperature changes of one or more components of the serial communication link (e.g., the phase offset of the two clocks may vary slowly over time as the temperature of the IC that includes the aggressor transmitter increases/decreases based on ambient temperature changes or operating conditions). Consequently, the estimated phase offset on which the selected set of symbol response coefficients is based during the training phase may not the optimal estimated phase offset as the actual phase offset dynamically is aperiodic.

One technique to account for random changes is the phase offset is to monitor the effectiveness of any one set of symbol response coefficients in cancelling crosstalk compared to adjacent sets of symbol response coefficients. If one of the adjacent sets of symbol response coefficients is more effective at cancelling crosstalk during a given measurement period, then that set of symbol response coefficients may be selected as the new set of symbol response coefficients used during the next measurement period. This continuous monitoring of the effectiveness of the selected set of symbol response coefficients may also be effective at tracking periodic shifts in the phase offset without having to measure the frequency offset between the in-service receive clock of the victim receiver and the in-service transmit clock of the aggressor transmitter as long as the measurement period is significantly smaller than the period of the switching frequency associated with the frequency offset. In other words, as long as the fixed number of baud duration F is greater than two or more measurement periods, such techniques may be able to compensate for drifting phase offsets caused by the frequency offset between the in-service receive clock of the victim receiver and the in-service transmit clock of the aggressor transmitter.

As shown in FIG. 7, a memory 710 stores sets of symbol response coefficients for N crosstalk correction circuits 720. Each crosstalk correction circuit 720 may correspond to a particular crosstalk channel associated with the given victim receiver. It will be appreciated that each crosstalk channel may be associated with a different phase offset $m_{min}^{(i)}$ corresponding to that crosstalk channel. Although not shown explicitly, each crosstalk correction circuit 720 receives a sequence of data symbols $\{d_k^{(i)}\}$ transmitted on that crosstalk channel, which are used, as described above, to calculate the noise contribute $n_j^{(i)}$ for that crosstalk channel. The noise contributions for all N dominant crosstalk channels are then summed to generate a noise estimate $\{\Sigma n_j^{(i)}(m)\}$ from all N dominant crosstalk channels. The noise estimate is subtracted from the noisy signal sampled by the ADC 374 of the receiver 370 before being demodulated by the comparator 730 to generate a demodulated victim PAM symbol $X(y_j)$ corresponding to crosstalk corrected sample $y_j$.

The technique for switching any given set of symbol response coefficients may be made by tracking a metric for the currently selected set of symbol response coefficients $\{p_k^{(i)}(m_c)\}$ and two adjacent sets of symbol response coefficients $\{p_k^{(i)}(m_c-1)\}\{p_k^{(i)}(m_c+1)\}$, where $m_c$ represents a current estimated phase offset for the crosstalk channel. If one of the two adjacent sets of symbol response coefficients for that crosstalk channel provides better cancellation, based on the metric, then the estimated phase offset $m_c$ may be changed by either incrementing or decrementing the estimated phase offset $m_c$ by one.

In one embodiment, the metric used for determining the quality of cancellation for a particular set of symbol response coefficients may be calculated using the absolute value of the error signal:

$$e_j = |y_j - X(y_j)| \quad \text{(Eq. 9)}$$

The error symbol is accumulated by the accumulator 740 and averaged over a fixed number D of baud durations:

$$\frac{1}{D}\sum_{J_c}^{j_c+D-1} e_j = \frac{1}{D}\sum_{J_c}^{j_c+D-1} |y_j - X(y_j)| \quad \text{(Eq. 10)}$$

In one embodiment, the given calculation is performed over three consecutive periods of D baud durations. During each of the three successive periods, noise cancellation is performed for one of the three adjacent sets of symbol response coefficients $\{p_k^{(i)}(m_c)\}$, $\{p_k^{(i)}(m_c-1)\}$, and $\{p_k^{(i)}(m_c+1)\}$. During the first period of D baud durations, the crosstalk correction circuits 720 are configured to utilize the first set of symbol response coefficients $\{p_k^{(i)}(m_c)\}$. The average error $e^{(0)}$ associated with the first set of symbol response coefficients $\{p_k^{(i)}(m_c)\}$ is calculated by the accumulator 740 and stored in memory 760. Then, during the second period of D baud durations, the crosstalk correction circuits 720 are reconfigured to utilize the second set of symbol response coefficients $\{p_k^{(i)}(m_c-1)\}$. The average error $e^{(-)}$ associated with the second set of symbol response coefficients $\{p_k^{(i)}(m_c-1)\}$ is calculated by the accumulator 740 and stored in memory 760. Finally, during the third period of D baud durations, the crosstalk correction circuits 720 are reconfigured to utilize the third set of symbol response coefficients $\{p_k^{(i)}(m_c+1)\}$. The average error $e^{(+)}$ associated with the third set of symbol response coefficients $\{p_k^{(i)}(m_c+1)\}$ is calculated by the accumulator 740 and stored in memory 760. The counter 750 may be used to count the number of baud durations during a given measurement period, reset the accumulator 740 to zero out the average area for a given set of symbol response coefficients, and trigger the crosstalk correction circuits 720 to be reconfigured to utilize the given set of symbol response coefficients.

The average error for all three sets of symbol response coefficients (i.e., $e^{(-)}$, $e^{(0)}$, and $e^{(+)}$) may be read from the memory 760 and transmitted to a comparator 770. The comparator 770 selects the set of symbol response coefficients corresponding to the minimum average error as the set of symbol response coefficients to use for the next measurement period. In other words, the comparator will decrement the current estimated phase index re by one for the next measurement period if the average error $e^{(-)}$ is the minimum value, increment the current estimated phase index m by one for the next measurement period if the average error $e^{(+)}$ is the minimum value, and leave the current estimated phase index $m_c$ unchanged for the next measurement period if the average error $e^{(0)}$ is the minimum value.

In one embodiment, the three consecutive periods of D baud durations may be run concurrently by including three separate circuits for tracking the metric associated with each set of symbol response coefficients. In other words, a first circuit performs noise cancellation using the first set of symbol response coefficients $\{p_k^{(i)}(m_c)\}$, a second circuit performs noise cancellation using the second set of symbol response coefficients $\{p_k^{(i)}(m_c-1)\}$, and a third circuit performs noise cancellation using the third set of symbol response coefficients $\{p_k^{(i)}(m_c+1)\}$. All three circuits are used to generate the metrics corresponding to the three sets of symbol response coefficients in parallel over a measurement period equal to D baud durations. At the end of the measurement period, the metrics may be compared to determine if the estimated phase offset index should be incremented or decremented for each crosstalk channel.

Figure 8A:
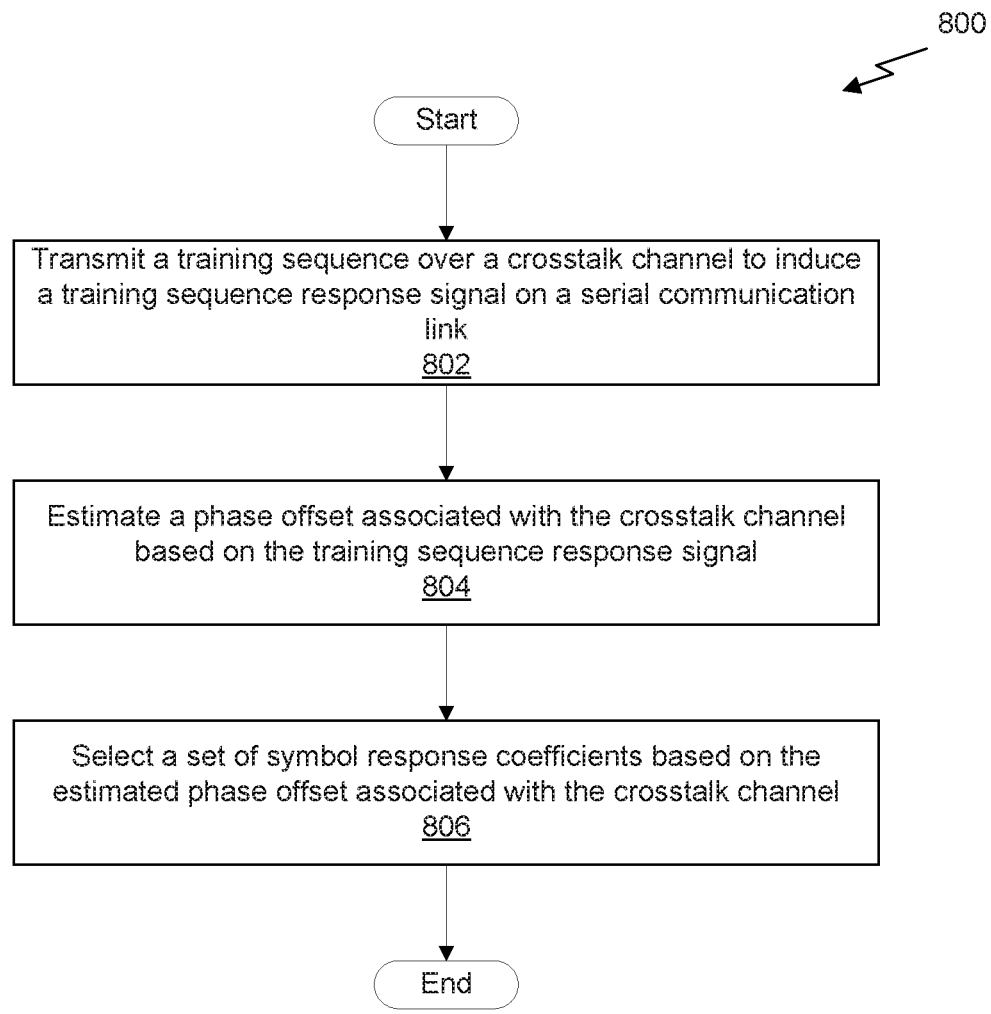
FIG. 8A is a flowchart of a method for selecting a set of symbol response coefficients corresponding to a crosstalk channel, in accordance with one embodiment.

FIG. 8A is a flowchart of a method 800 for selecting a set of symbol response coefficients corresponding to a crosstalk channel, in accordance with one embodiment. At step 802, a training sequence is transmitted over a crosstalk channel to induce a training sequence response signal on a serial communication link. In one embodiment, the serial communication link is a serial communication channel 114 on a backplane 110 of a telecommunications system 100. However, in alternate embodiments, the serial communication link may be any serial communication channel with one or more sources of crosstalk for which a receiver coupled to the serial communication link has access to the data symbols transmitted over the sources of crosstalk.

At step 804, a phase offset associated with the crosstalk channel is estimated based on the training sequence response signal. A particular phase offset from a number M of phase offsets uniformly distributed over a baud duration T is selected as the estimated phase offset based on a particular metric. In one embodiment, the phase offset associated with the crosstalk channel is estimated by collecting, via a receiver, a set of samples of the training sequence response signal. For each phase offset in a plurality of phase offsets, a metric value is calculated according to Equation 6, shown above. Then, the phase offset in the plurality of phase offsets that minimizes the metric value is selected as the estimated phase offset. In another embodiment, the phase offset associated with the crosstalk channel is estimated by collecting, via a receiver, a set of samples of the training sequence response signal. For each phase offset in a plurality of phase offsets, a metric value is calculated according to Equation 7, shown above. Then, the phase offset in the plurality of phase offsets that minimizes the metric value is selected as the estimated phase offset.

At step 806, a set of symbol response coefficients is selected based on the estimated phase offset associated with the crosstalk channel. The set of symbol response coefficients may be utilized with a tapped delay line using the data symbols transmitted on a particular crosstalk channel for estimating the noise contributed on the serial communication link by that crosstalk channel.

The method 800 may be utilized to select a set of symbol response coefficients for a particular crosstalk channel based on a phase offset estimated for that crosstalk channel. The method 800 may be repeated for more than one crosstalk channel in order to select separate and distinct sets of symbol response coefficients for multiple crosstalk channels. These sets of symbol response coefficients can then be used to perform crosstalk cancellation for the serial communication link.

Figure 8B:
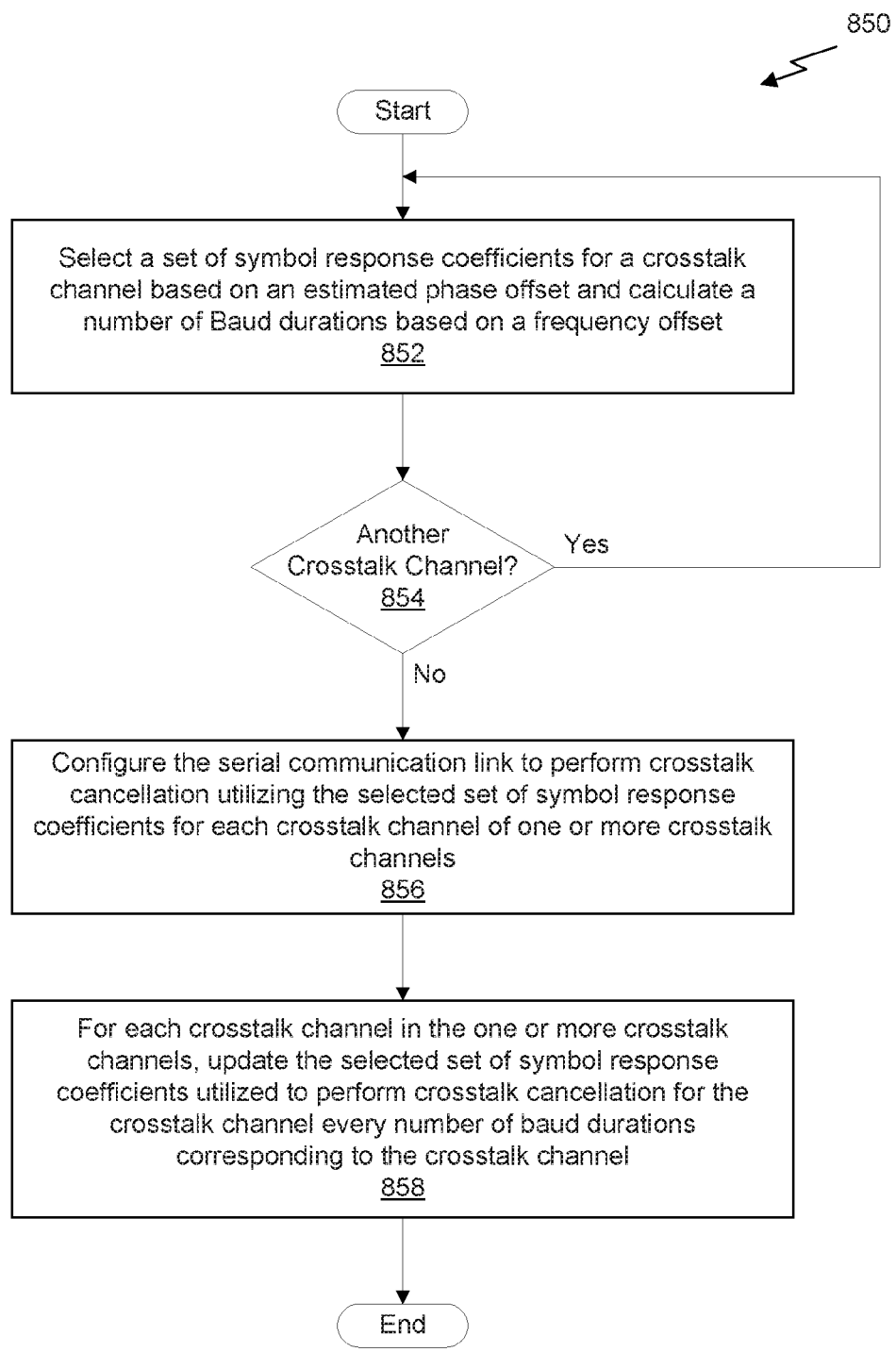
FIG. 8B is a flowchart of a method for training a serial communication link, in accordance with one embodiment.

FIG. 8B is a flowchart of a method 850 for training a serial communication link, in accordance with one embodiment. At step 852, a set of symbol response coefficients are selected for a crosstalk channel based on an estimated phase offset for the crosstalk channel. In one embodiment, step 852 is implemented by performing the method 800 of FIG. 8A. At step 854, logic determines whether another crosstalk channel is associated with the serial communication link. Again, a set of symbol response coefficients may be selected for multiple crosstalk channel s in order to cancel crosstalk from multiple crosstalk channels at a victim receiver of a given serial communication link. If there is another crosstalk channel associated with the serial communication link, then the method 850 returns to step 852 where another set of symbol response coefficients is selected for the next crosstalk channel. However, if, at step 854, there are no additional crosstalk channels, then the method 850 continues to step 856, where the serial communication link is configured to perform crosstalk cancellation utilizing the selected set of symbol response coefficients for each crosstalk channel of one or more crosstalk channels. In one embodiment, a SerDes device 320 includes a noise correction circuit 378 that performs crosstalk cancellation based on the sets of symbol response coefficients and the known data symbols transmitted over the one or more crosstalk channels.

At step 858, for each crosstalk channel in the one or more crosstalk channels, the selected set of symbol response coefficients utilized to perform crosstalk cancellation for the crosstalk channel is updated every number of baud durations corresponding to the crosstalk channel. In one embodiment, a frequency offset between the in-service receive clock of the victim receiver and the in-service transmit clock of the aggressor transmitter is utilized to generate a control signal for a voltage controlled oscillator in order to generate a selection clock that is utilized to control the updating of the selected set of symbol response coefficients. In another embodiment, a metric associated with multiple sets of symbol response coefficients is calculated during one or more periods, and the set of symbol response coefficients that minimizes the metric is selected to replace the set of symbol response coefficients utilized during the last measurement period.

Figure 8C:
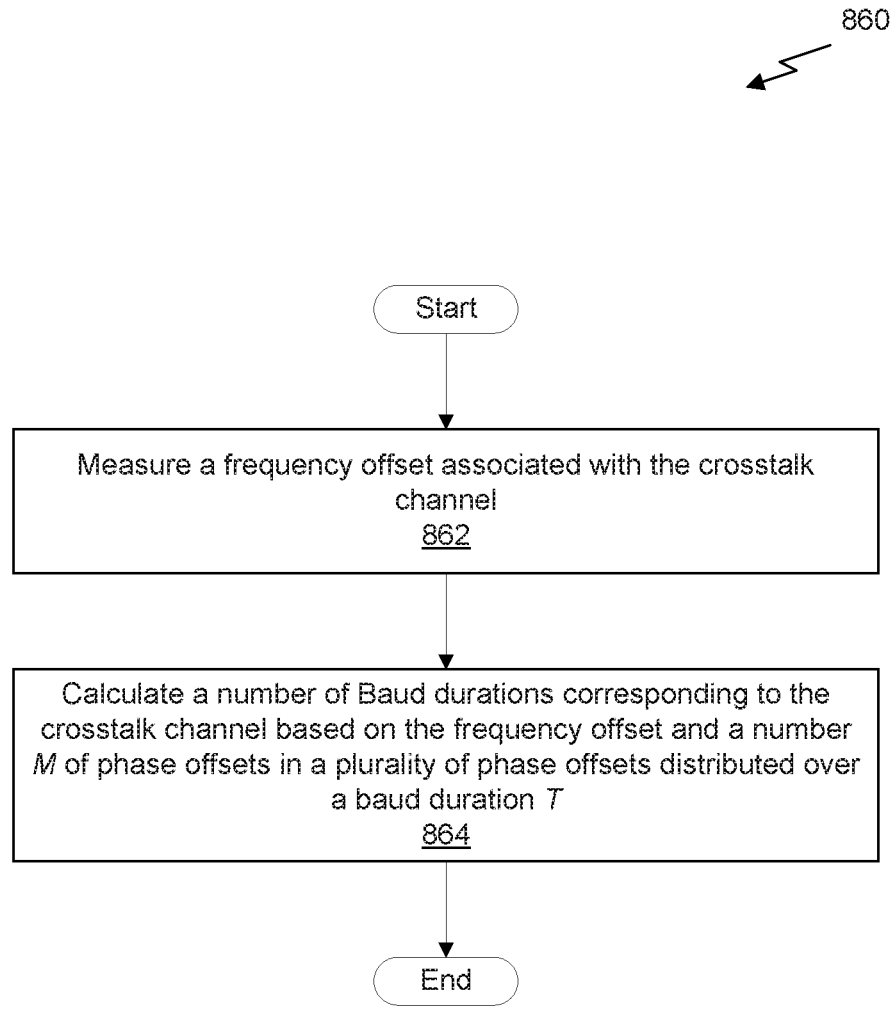
FIG. 8C is a flowchart of a method for updating the selected set of symbol response coefficients, in accordance with one embodiment.

FIG. 8C is a flowchart of a method 860 for updating the selected set of symbol response coefficients, in accordance with one embodiment. At step 862, a frequency offset associated with the crosstalk channel is measured. In one embodiment, a clock and data recovery unit measures the frequency offset associated with the crosstalk channel by comparing the in-service receive clock for the channel to an in-service transmit clock of an aggressor transmitter of the crosstalk channel.

At step 864, a number of Baud durations corresponding to the crosstalk channel is calculated based on the frequency offset and a number M of phase offsets in a plurality of phase offsets distributed over a baud duration T. In one embodiment, the number of Baud durations represents the timing for when to switch the set of symbol response coefficients for a current phase offset to a new set of symbol response coefficients for a next phase offset in the plurality of phase offsets. The number of baud durations decreases inversely proportional to the magnitude of the frequency offset associated with the crosstalk channel. In one embodiment, MA sets of symbol response coefficients are stored in a memory, and a selection clock is utilized to increment a counter that generates a control signal for a multiplexor connected to registers storing the M sets of symbol response coefficients. The multiplexor couples one particular set of symbol response coefficients in the memory to a set of registers included in a noise estimation unit.

Figure 8D:
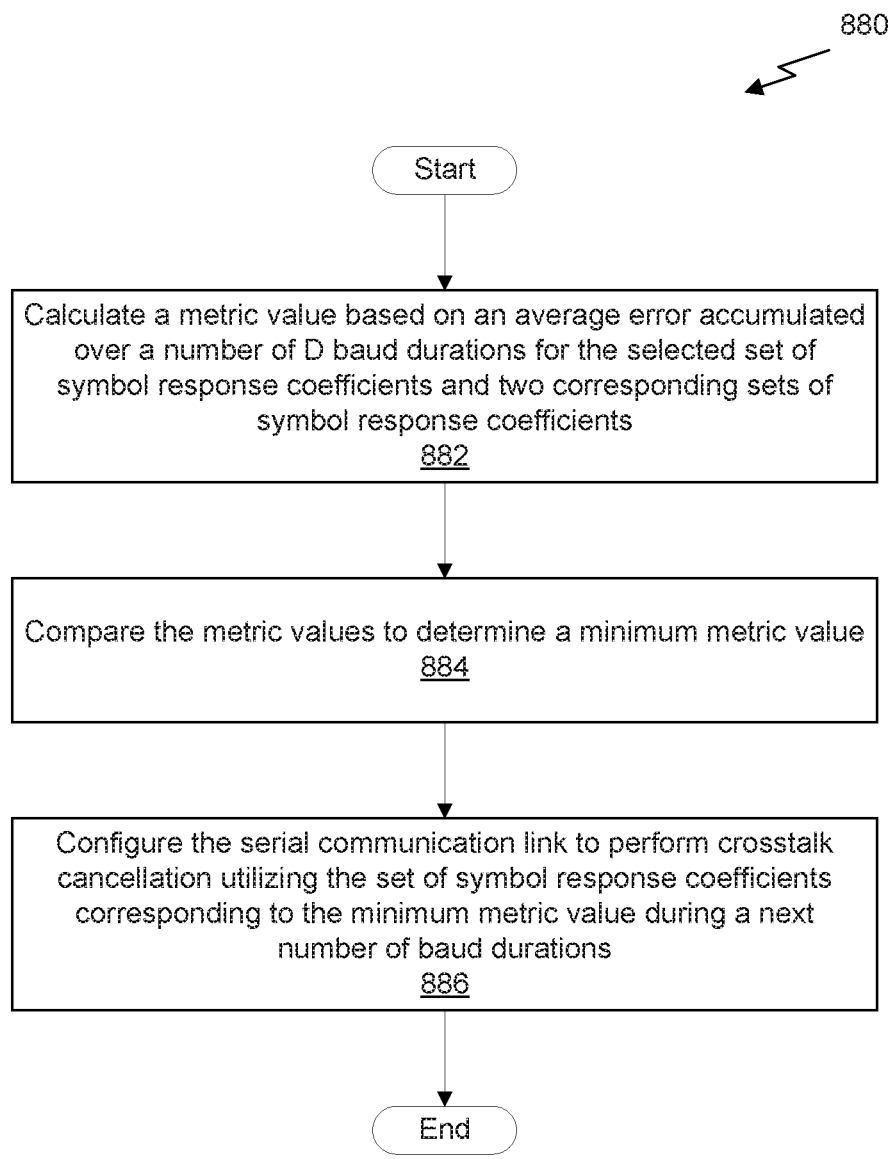
FIG. 8D is a flowchart of a method for updating the selected set of symbol response coefficients, in accordance with another embodiment.

FIG. 8D is a flowchart of a method 880 for updating the selected set of symbol response coefficients, in accordance with one embodiment. At step 882, a metric value is calculated based on an average error accumulated over a number of D baud durations for the selected set of symbol response coefficients and two corresponding sets of symbol response coefficients. In one embodiment, the two corresponding sets of symbol response coefficients are the two adjacent sets of symbol response coefficients (i.e., the sets of symbol response coefficients corresponding to the phase offset closest to the estimated phase offset of the selected set of symbol response coefficients).

At step 884, the metric values are compared to determine a minimum metric value. In one embodiment, the three metric values refer to $e^{(-)}$, $e^{(0)}$, and $e^{(+)}$. At step 886, the serial communication link is configured to perform crosstalk cancellation utilizing the set of symbol response coefficients corresponding to the minimum metric value during a next number of baud durations. In one embodiment, the serial communication link is reconfigured to use a new set of symbol response coefficients if either $e^{(-)}$ or $e^{(+)}$ is the minimum metric value, and the previous set of symbol response coefficients is replaced in registers included in a noise estimation unit.

Figure 9:
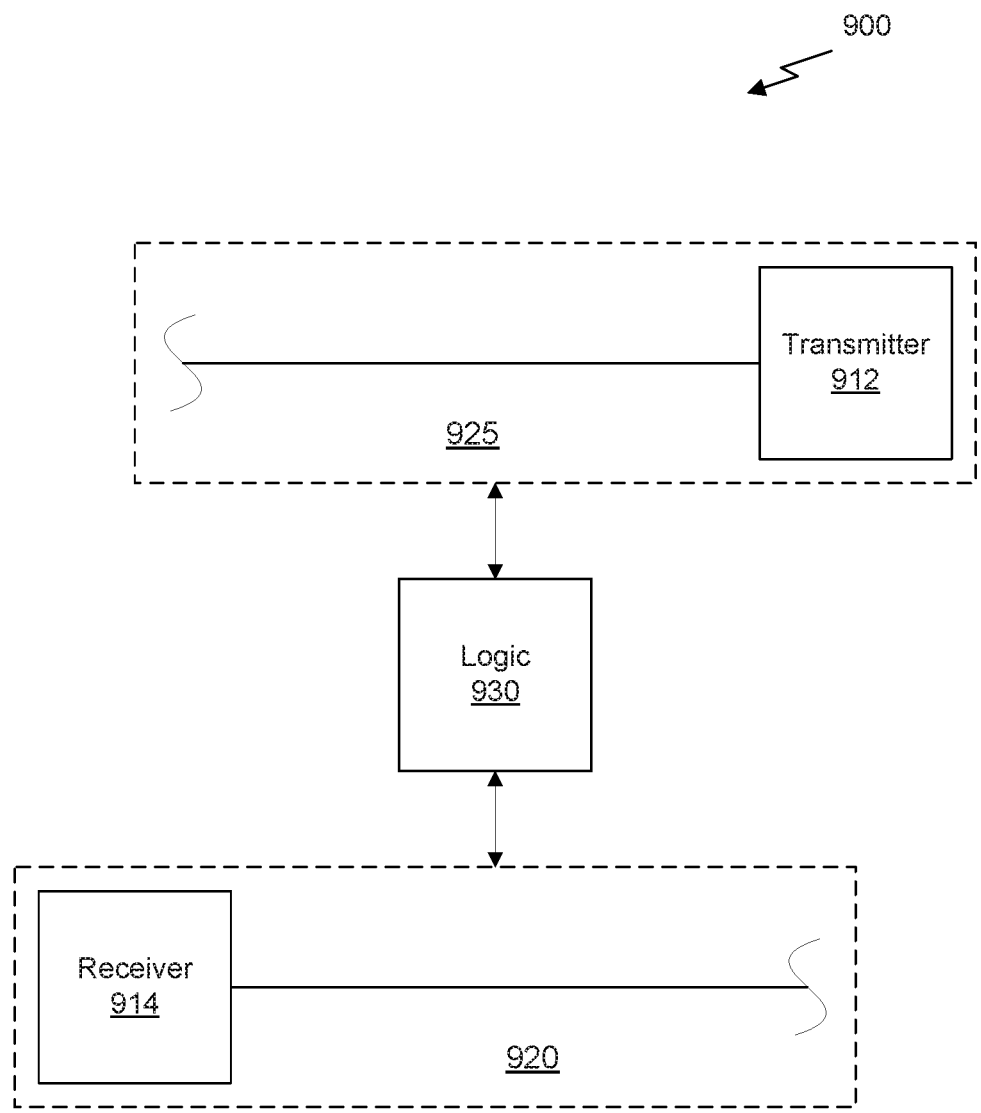
FIG. 9 illustrates a system for training a serial communication link, in accordance with one embodiment.

FIG. 9 illustrates a system 900 for training a serial communication link, in accordance with one embodiment. As an option, the system 900 may be implemented with one or more features of any one or more of the embodiments set forth in any previous and/or subsequent figure(s) and/or description thereof. However, it is to be appreciated that the system 900 may be implemented in the context of any desired environment.

As shown, a serial communication link 920 includes a receiver 914 coupled to a communication channel (i.e., a physical interface for transmitting signals between a transmitter and the receiver 914). Although not shown explicitly, the serial communication link 920 may also be coupled to a transmitter configured to send signals to the receiver 914. The receiver 914 is configured to sample a signal on the serial communication link 920 according to a receive clock.

The serial communication link 920 is coupled to logic 930 for training the serial communication link 920 to perform crosstalk cancellation. The logic 930 may cause a training sequence to be transmitted by a transmitter 912 over a crosstalk channel 925 to induce a training sequence response signal on the serial communication link 920. In various embodiments, the logic 930 may transmit a signal to the transmitter 912 included in the crosstalk channel 925 that causes the transmitter 912 to transmit the training sequence over the crosstalk channel 925. The logic 930 may estimate a phase offset associated with the crosstalk channel 925 based on the training sequence response signal.

In one embodiment, the logic 930 causes the receiver 914 to sample the training sequence response signal on the serial communication link 920. The samples of the training sequence response signal may be utilized to calculate a metric for each phase offset in a plurality of phase offsets, the plurality of calculated metrics utilized to select a particular phase offset that minimizes the metric as the estimated phase offset associated with the crosstalk channel 925.

The logic 930 is configured to select a set of symbol response coefficients based on the estimated phase offset associated with the crosstalk channel 925, and configure the serial communication link 920 to perform crosstalk cancellation utilizing the selected set of symbol response coefficients for each crosstalk channel 925 of one or more crosstalk channels. The serial communication link 920 may be configured by configuring a noise estimation unit in the receiver 914 to utilize the selected set of symbol response coefficients for the crosstalk channel 925.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein include the one or more modes known to the inventor for carrying out the claimed subject matter. It is to be appreciated that variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method for training a serial communication link to perform crosstalk cancellation, comprising:
    for each crosstalk channel in one or more crosstalk channels associated with the serial communication link:
        transmitting a training sequence over the crosstalk channel to induce a training sequence response signal on the serial communication link,
        estimating a phase offset associated with the crosstalk channel based on the training sequence response signal, and
        selecting a set of symbol response coefficients based on the estimated phase offset associated with the crosstalk channel;
    configuring the serial communication link to perform crosstalk cancellation utilizing the selected set of symbol response coefficients for each crosstalk channel of the one or more crosstalk channels; and
    for each crosstalk channel in the one or more crosstalk channels, updating the selected set of symbol response coefficients utilized to perform crosstalk cancellation for the crosstalk channel every number of Baud durations corresponding to the crosstalk channel.

2. The method of claim 1, wherein estimating the phase offset associated with the crosstalk channel comprises:
    collecting a set of samples of the training sequence response signal;
    for each phase offset in a plurality of phase offsets:
        for each sample in the set of samples of the training sequence response signal, calculating a difference value corresponding to the sample by subtracting a pre-computed response value associated with the phase offset from the sample,
        squaring the difference value for each sample, and
        summing the squared difference values to calculate a metric value for the phase offset; and
    selecting a phase offset in the plurality of phase offsets that minimizes the metric value,
    wherein the plurality of phase offsets comprise a number M of phase offsets uniformly distributed over a baud duration T.

3. The method of claim 1, wherein estimating the phase offset associated with the crosstalk channel comprises:
    collecting a set of samples of the training sequence response signal;
    for each phase offset in a plurality of phase offsets:
        for each sample in the set of samples of the training sequence response signal, calculating a difference value corresponding to the sample by subtracting a pre-computed response value associated with the phase offset from the sample, determining an absolute value of the difference value for each sample, and summing the absolute difference values to calculate a metric value for the phase offset; and selecting a phase offset in the plurality of phase offsets that minimizes the metric value, wherein the plurality of phase offsets comprise a number M of phase offsets uniformly distributed over a baud duration T.

4. The method of claim 1, wherein updating the selected set of symbol response coefficients utilized to perform crosstalk cancellation for the crosstalk channel comprises:

measuring a frequency offset associated with the crosstalk channel, and calculating a number of Baud durations corresponding to the crosstalk channel based on the frequency offset and a number M of phase offsets in a plurality of phase offsets distributed over a baud duration T.

5. The method of claim 1, wherein updating the selected set of symbol response coefficients utilized to perform crosstalk cancellation for the crosstalk channel comprises:

calculating a metric value based on an average error accumulated over a number of D baud durations for the selected set of symbol response coefficients and two corresponding sets of symbol response coefficients, comparing the metric values to determine a minimum metric value, and configuring the serial communication link to perform crosstalk cancellation utilizing the set of symbol response coefficients corresponding to the minimum metric value during a next number of baud durations.

6. The method of claim 1, wherein the serial communication link comprises a trace on a backplane coupled to two or more line cards, wherein the trace is coupled to a first connector coupled to a first line card in the two or more line cards and a second connector coupled to a second line card in the two or more line cards, wherein the first connector is coupled to a trace on the first line card that couples the trace on the backplane to a serializer/deserializer (SerDes) device included on the first line card, and wherein the second connector is coupled to a trace on the second line card that couples the trace on the backplane to a SerDes device included on the second line card.

7. The method of claim 6, wherein the SerDes device included on the first line card includes a receiver configured to sample the serial communication link according to an in-service phase of a receive clock.

8. The method of claim 7, wherein the SerDes device included on the second line card includes a transmitter configured to transmit the training sequence over the crosstalk channel according to an in-service phase of a transmit clock.

9. The method of claim 6, wherein a controller on the first line card is configured to:

estimate the phase offset associated with the crosstalk channel based on the sampled training sequence response signal, and select the set of symbol response coefficients based on the estimated phase offset.

10. A communication system, comprising:

a serial communication link;

a receiver coupled to the serial communication link; and logic for training the serial communication link, the logic configured to:

for each crosstalk channel in one or more crosstalk channels associated with the serial communication link:

transmit a training sequence over the crosstalk channel to induce a training sequence response signal on the serial communication link, estimate a phase offset associated with the crosstalk channel based on the training sequence response signal, and select a set of symbol response coefficients based on the estimated phase offset associated with the crosstalk channel;

configuring the serial communication link to perform crosstalk cancellation utilizing the selected set of symbol response coefficients for each crosstalk channel of the one or more crosstalk channels; and for each crosstalk channel in the one or more crosstalk channels, update the selected set of symbol response coefficients utilized to perform crosstalk cancellation for the crosstalk channel every number of Baud durations corresponding to the crosstalk channel.

11. The system of claim 10, wherein estimating the phase offset associated with the crosstalk channel comprises:

collecting a set of samples of the training sequence response signal;

for each phase offset in a plurality of phase offsets:

for each sample in the set of samples of the training sequence response signal, calculating a difference value corresponding to the sample by subtracting a pre-computed response value associated with the phase offset from the sample, squaring the difference value for each sample, and summing the squared difference values to calculate a metric value for the phase offset; and selecting a phase offset in the plurality of different phase offsets that minimizes the metric value, wherein the plurality of phase offsets comprise a number M of phase offsets uniformly distributed over a baud duration T.

12. The system of claim 10, wherein estimating the phase offset associated with the crosstalk channel comprises:

collecting a set of samples of the training sequence response signal;

for each phase offset in a plurality of phase offsets:

for each sample in the set of samples of the training sequence response signal, calculating a difference value corresponding to the sample by subtracting a pre-computed response value associated with the phase offset from the sample, determining an absolute value of the difference value for each sample, and summing the absolute difference values to calculate a metric value for the phase offset; and selecting a phase offset in the plurality of phase offsets that minimizes the metric value, wherein the plurality of phase offsets comprise a number M of phase offsets uniformly distributed over a baud duration T.

13. The system of claim 10, wherein updating the selected set of symbol response coefficients utilized to perform crosstalk cancellation for the crosstalk channel comprises:

measuring a frequency offset associated with the crosstalk channel, and calculating a number of Baud durations corresponding to the crosstalk channel based on the frequency offset and a number M of phase offsets in a plurality of phase offsets distributed over a baud duration T.

14. The system of claim 10, wherein updating the selected set of symbol response coefficients utilized to perform crosstalk cancellation for the crosstalk channel comprises:
  calculating a metric value based on an average error accumulated over a number of D baud durations for the selected set of symbol response coefficients and two corresponding sets of symbol response coefficients,
  comparing the metric values to determine a minimum metric value, and
  configuring the serial communication link to perform crosstalk cancellation utilizing the set of symbol response coefficients corresponding to the minimum metric value during a next number of baud durations.

15. The system of claim 10, wherein the serial communication link comprises a trace on a backplane coupled to two or more line cards, wherein the trace is coupled to a first connector coupled to a first line card in the two or more line cards and a second connector coupled to a second line card in the two or more line cards, wherein the first connector is coupled to a trace on the first line card that couples the trace on the backplane to a serializer/deserializer (SerDes) device included on the first line card, and wherein the second connector is coupled to a trace on the second line card that couples the trace on the backplane to a SerDes device included on the second line card.

16. The system of claim 15, wherein the SerDes device included on the first line card includes a receiver configured to sample the serial communication link according to an in-service phase of a receive clock.

17. The system of claim 16, wherein the SerDes device included on the second line card includes a transmitter configured to transmit the training sequence over the crosstalk channel according to an in-service phase of a transmit clock.

18. The system of claim 17, wherein the logic comprises program instructions executed by a controller on the first line card, the program instructions configured to:
  estimate the phase offset associated with the crosstalk channel based on the sampled training sequence response signal, and
  select the set of symbol response coefficients based on the estimated phase offset.

19. A non-transitory computer-readable media storing computer instructions for training a serial communication link to perform crosstalk cancellation that, when executed by one or more processors, cause the one or more processors to perform the steps of:
  for each crosstalk channel in one or more crosstalk channels associated with the serial communication link:
    transmitting a training sequence over the crosstalk channel to induce a training sequence response signal on the serial communication link,
    estimating a phase offset associated with the crosstalk channel based on the training sequence response signal, and
    selecting a set of symbol response coefficients based on the estimated phase offset associated with the crosstalk channel;
  configuring the serial communication link to perform crosstalk cancellation utilizing the selected set of symbol response coefficients for each crosstalk channel of the one or more crosstalk channels; and
  for each crosstalk channel in the one or more crosstalk channels, updating the selected set of symbol response coefficients utilized to perform crosstalk cancellation for the crosstalk channel every number of Baud durations corresponding to the crosstalk channel.

20. The computer readable media of claim 19, wherein estimating the phase offset associated with the crosstalk channel comprises:
  collecting a set of samples of the training sequence response signal;
  for each phase offset in a plurality of phase offsets:
    for each sample in the set of samples of the training sequence response signal, calculating a difference value corresponding to the sample by subtracting a pre-computed response value associated with the phase offset from the sample,
    determining an absolute value of the difference value for each sample, and
    summing the absolute difference values to calculate a metric value for the phase offset, and
  selecting a phase offset in the plurality of phase offsets that minimizes the metric value,
  wherein the plurality of phase offsets comprise a number M of phase offsets uniformly distributed over a baud duration T.

* * * * *